US011860662B2

(12) United States Patent
Bartel et al.

(10) Patent No.: US 11,860,662 B2
(45) Date of Patent: Jan. 2, 2024

(54) CONTROL DEVICE

(71) Applicant: Excel Industries, Inc., Hesston, KS (US)

(72) Inventors: Harlan J. Bartel, Newton, KS (US); Brian L Nebel, Hesston, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 0 days.

(21) Appl. No.: 15/881,403

(22) Filed: Jan. 26, 2018

(65) Prior Publication Data

US 2018/0217626 A1 Aug. 2, 2018

Related U.S. Application Data

(60) Provisional application No. 62/451,668, filed on Jan. 28, 2017.

(51) Int. Cl.
*G05G 1/015* (2008.04)
*G05G 1/04* (2006.01)
*G05G 9/047* (2006.01)

(52) U.S. Cl.
CPC ............... *G05G 1/04* (2013.01); *G05G 1/015* (2013.01); *G05G 9/047* (2013.01); *G05G 2009/04703* (2013.01); *G05G 2700/02* (2013.01)

(58) Field of Classification Search
CPC .. G05G 2009/04703; G05G 1/04; G05G 1/08; G05G 1/085; G05G 5/02;
(Continued)

(56) References Cited

U.S. PATENT DOCUMENTS 3,219,296 A * 11/1965 Rasmussen ......... B64C 13/0421 244/234
3,350,956 A * 11/1967 Monge ............... G05G 9/04737 74/471 R
(Continued)

FOREIGN PATENT DOCUMENTS

EP 1433123 A1 6/2004
JP 2002306277 A 10/2002
(Continued)

OTHER PUBLICATIONS

"3-axis joystick IP65 | CST100F2 NSI," NSI, directindustry.com, Dec. 3, 2015. http://web.archive.org/web/20151203220330/http://www.directindustry.com/prod/nsi/product71291584395.html.
(Continued)

*Primary Examiner* — Gregory Robert Weber
(74) *Attorney, Agent, or Firm* — SHOOK, HARDY & BACON L.L.P.

(57) ABSTRACT

Aspects hereof relate to control devices for controlling features or functions of apparatuses and devices. At a high level, the control devices described herein provide an input locus that is positioned within a handle of the control devices. The input locus may have a fixed position such that the control device may resist movement in response to forces applied to the handle in force vectors passing through the input locus. Further, the handle may pivot or rotate about the input locus in response to forces applied to the handle in force vectors that are offset from the input locus to generate inputs and/or controls.

15 Claims, 25 Drawing Sheets

(58) Field of Classification Search
CPC . G05G 7/00; G05G 7/02; G05G 11/00; G05G 1/40; G05G 1/405; A01D 34/824; A01D 2034/6843
USPC .............................. 16/437; 74/488, 145, 144
See application file for complete search history.

(56) References Cited

U.S. PATENT DOCUMENTS 4,012,014 A * 3/1977 Marshall ............. B64C 13/0421 244/234
4,048,791 A * 9/1977 Treen ..................... A01D 34/02 56/17.6
4,069,720 A * 1/1978 Thor ........................ G05G 9/04 74/471 R
4,264,095 A * 4/1981 Lemasters ................. E01H 5/02 294/53.5
4,726,248 A * 2/1988 Kawai ...................... B25J 13/02 74/471 XY
4,920,820 A * 5/1990 Ingham .................... B62D 1/12 74/471 XY
5,045,842 A 9/1991 Galvin
5,125,602 A * 6/1992 Vauvelle ............. B64C 13/0421 244/237
5,265,307 A * 11/1993 Hull ....................... A45C 13/26 16/406
5,379,663 A * 1/1995 Hara ........................ B25J 13/02 345/161
D359,206 S * 6/1995 Bojar ............................ 172/372
5,473,325 A 12/1995 McAlindon
5,528,265 A 6/1996 Harrison
5,549,167 A * 8/1996 Keperling, Sr. ......... A01B 1/06 172/372
5,829,808 A * 11/1998 Colla ........................ E01H 5/02 294/53.5
5,956,018 A 9/1999 Pejic et al.
6,366,274 B1 4/2002 Elledge
6,421,043 B1 7/2002 Uno
6,727,889 B2 4/2004 Shaw
7,113,171 B2 9/2006 Vayda
7,618,381 B2 11/2009 Krebs et al.
8,839,692 B2 * 9/2014 Yanai ................... A01B 33/028 74/551.4
9,069,396 B2 6/2015 Adler et al.
9,411,358 B2 * 8/2016 Ben-Dor .................. G05G 1/04
9,823,686 B1 * 11/2017 Clause ................... G05G 9/047
9,889,874 B1 * 2/2018 Clause ..................... B25J 13/02
2003/0058219 A1 3/2003 Shaw
2004/0099081 A1 * 5/2004 Riwan ........................ B25J 3/04 74/490.01
2005/0016822 A1 1/2005 Mowatt et al.
2006/0090588 A1 * 5/2006 Zumbusch ............... B62D 1/12 74/543
2008/0193260 A1 * 8/2008 Yokokohji ............... G05G 9/04 901/4
2010/0045604 A1 2/2010 Kim
2014/0160015 A1 * 6/2014 Ogawa ..................... B25J 13/02 345/156
2014/0267039 A1 9/2014 Curtis
2015/0153842 A1 6/2015 Obermeyer et al.
2015/0212599 A1 7/2015 Charlton et al.

FOREIGN PATENT DOCUMENTS

WO 03088204 A1 10/2003
WO 2011146668 A2 11/2011

OTHER PUBLICATIONS

"3 axis Joystick Potentiometer TF 300 5K/10K Security Control Ball Machine Keyboard Monitor Joystick," AliExpress™, aliexpress.com, accessed: Sep. 2016. http://www.aliexpress.com/store/product/Free-Shipping-Joystick-Potentiometer-TF-300-5K-10K-3D-Security-Yuntai-Control-Ball-Machine-Keyboard-Monitor/316664_2034567710.html.
Wittler, Frank E., "Apollo Experience Report Crew Station Integration: vol. III—Spacecraft Hand Controller Development," NASA, hq.nasa.gov, TN D7884, Mar. 1975. https://www.hq.nasa.gov/alsj/tnD7884HandContrlr.pdf.
"ERGOJOYSTICK an innovative power wheelchair joystick handle" Roll Geek LLC, 2014 http://www.ergojoystick.com/handles.

* cited by examiner

CONTROL DEVICE

CROSS-REFERENCE TO RELATED APPLICATIONS

This application claims priority to, pending U.S. Provisional Application No. 62/451,668, filed Jan. 28, 2017, the disclosures of which is hereby incorporated by reference in its entirety for any and all purposes.

FIELD

Aspects provided relate to input and control devices. More particularly, aspects herein relate to manual control devices.

BACKGROUND

Vehicles, equipment, machinery, and the like, often employ input/control devices for controlling various functions. For example, control devices may manage, command, or direct functions of a controlled-apparatus such as speed and direction of travel, articulation of attachments, and operation of power takeoffs, among others. Additionally, control devices may be part of a control system or scheme that requires the use of both of an operator's hands to govern the various functions of the controlled-apparatus. As can be appreciated, such equipment often encounters uneven terrain, varying speeds, bumps, and changes in direction. Accordingly, equipment operators are frequently subjected to forces that destabilize or jostle the operator. As a result, an equipment operator may instinctively react in order to stabilize their body, often using their hands, which may be grasping controls, to do so.

One example of a control device is a joystick, which typically includes a stick that pivots in a base, and uses the angle of the stick, relative to the base, to determine commands. Because traditional joystick controls have a pivot point that is below the operator's hands, e.g., in the base of the controls, any forces applied to the joystick, for example via a handle, may create inputs and corresponding commands.

As a result, the operator may instinctively react by pushing or pulling on the joystick to stabilize themselves, causing unwanted and inadvertent inputs. Resultantly, the joystick controls the equipment, which may cause unintended movement of attachments, or changes in the direction/speed of travel of the equipment.

Prior attempts to ameliorate these problems included providing rigid members, such as metal bars welded to the equipment, near the control device so that an operator can grasp the rigid members to stabilize their body. However, grasping such a rigid member commonly requires that an operator release at least one of the controls. This may be undesirable, as the operator may need to use both controls to adequately control the speed and direction of travel of the equipment and/or operation of the attachments.

SUMMARY

Aspects hereof relate to control devices for controlling features or functions of apparatuses and devices. At a high level, the control devices described herein provide an input locus that is positioned within an operator-engagement region, which may, for example, correspond to a handle of a control device. The input locus may have a fixed position such that the control device may resist movement in response to forces applied to the handle in force vectors passing through the input locus. Further, the handle may pivot or rotate about the input locus in response to forces applied to the handle in force vectors that are offset from the input locus to generate inputs and/or controls. Accordingly, the control devices described herein may provide a reference point within the handle that may receive stabilizing forces from an operator without generating inadvertent inputs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1A:
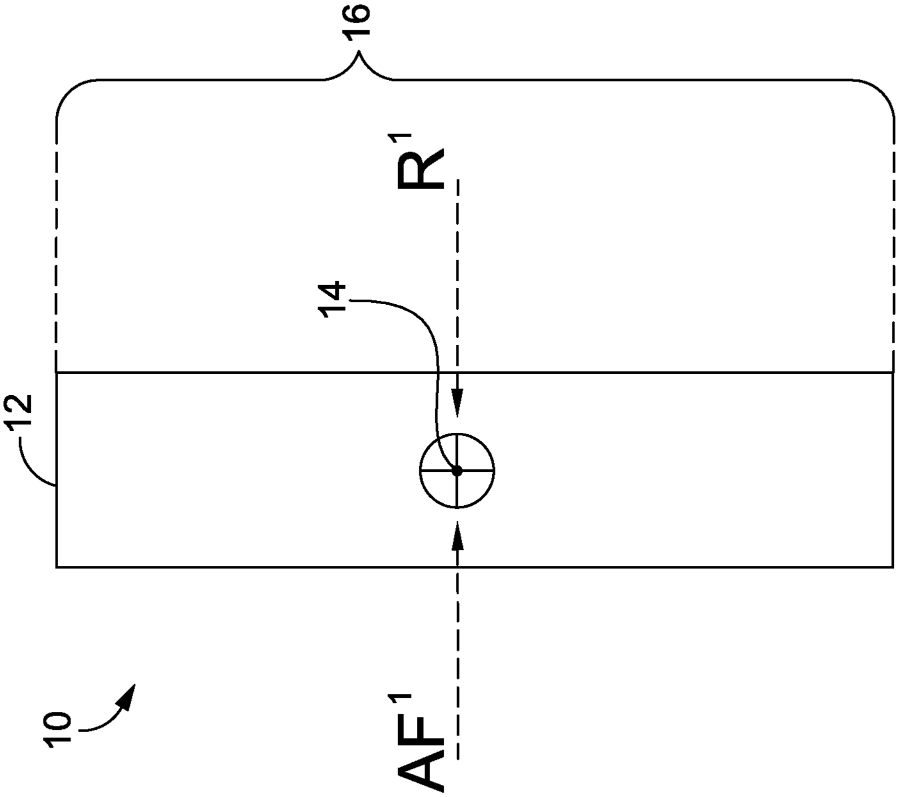
FIGS. 1A and 1B provide a diagrammatic depiction of a simplified control device, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

A first exemplary embodiment provides a control device having a mount, which may be affixed to or coupled with a controlled-apparatus or device. The control device may also include a handle rotatably coupled with the mount, the handle having an operator-engagement region. An input locus about which the handle rotates to provide inputs may be positioned within the operator-engagement region. Further, the handle may be coupled with the mount to resist movement in response to a force in a force vector extending through the input locus and to rotate in response to a force in a force vector that is offset from the input locus.

A second exemplary embodiment provides for a joystick-type control device. The joystick may comprise a base and a rod extending from the base. A handle may be fitted about the rod and may be pivotably coupled with a distal end of the rod. The joystick may also include an input locus positioned within the handle, proximate the distal end of the rod. Additionally, the position of the input locus may be a fixed position that is external to the base.

Yet another exemplary embodiment provides a control device including a mount assembly affixed to a vehicle. The control device may also include a handle rotatably coupled with the mount assembly, the handle having an operator-engagement region. An input locus about which the handle rotates to provide inputs may be positioned within the operator-engagement region. The handle may be coupled with the mount assembly to resist movement in response to a force in a vector extending through the input locus, and to rotate in two or more axes in response to forces in vectors that are offset from the input locus.

An additional exemplary embodiment may provide a control device that includes a mount and rotary handles rotatably coupled with opposite sides of the mount. Each of the rotary handles may include an operator-engagement region and an input locus. The input loci may be positioned coaxially with one another about a rotational axis. The rotary handles may be coupled with the mount to resist movement in response to forces applied to the operator-engagement regions in force vectors passing through the rotational axis, and to rotate in response to forces applied in the operator-engagement regions in force vectors that are offset from the rotational axis.

Aspects hereof may be described using directional terminology. For example, the Cartesian coordinate system may be used to describe positions and movement or rotation of the features described herein. Accordingly, some aspects may be described with reference to three mutually perpendicular axes. The axes may be referred to herein as lateral, longitudinal, and vertical, and may be indicated by reference characters X, Y, and Z, respectively, in the accompanying figures. For example, the terms "vertical" and "vertically" as used herein refer to a direction perpendicular to, each of the lateral and longitudinal axes. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Additionally, the term "distal" refers to a portion of a feature herein that is positioned away from a midpoint of the feature.

FIG. 1A provides a simplified depiction of an exemplary control device 10, in accordance with aspects hereof. The exemplary control device 10 may include a handle 12, which may be used by an operator to provide inputs for controlling features and functions of a device or apparatus associated with the control device 10. The features and functions may include speed and direction of travel, operation of attachments, peripheral devices, and any other controllable component or function of a controlled-apparatus or device. The exemplary control device 10 may include an operator-engagement region 16, which generally corresponds to a portion of the control device 10 that can receive forces for producing inputs. As only one example, the operator-engagement region 16 may be a portion of the handle 12 that is configured to be gripped by an operator.

The exemplary control device 10 also includes an input locus 14, positioned within the operator-engagement region 16. In some aspects, the input locus 14 may be positioned proximate a center point of the operator-engagement region 16, and/or proximate a point that corresponds to a center of an operator's palm. As used herein, the input locus 14 generally refers to a point in three-dimensional space relative to which the control device 10 moves to produce inputs.

In aspects described herein, the position of the input locus 14 may be fixed, such that forces applied to the control device 10 in vectors extending through the input locus 14 do not result in generating inputs. For example, a first applied force $AF^1$, applied in a force vector passing through the input locus 14, results in an equal and opposite first reactive force $R^1$. Said another way, the first applied force $AF^1$=first reactive force $R^1$, which prevents movement of the control device 10 and the generation of inputs.

Accordingly, forces applied to the handle 12 at the input locus 14 are met with equal and opposite forces, such that no input is produced by the control device 10 as a result of the forces applied. In operation, this creates a fixed point of reference, or ballast, within the handle 12 that may be used by an operator for stabilizing or steadying their body. For example, the exemplary control device 10 may be controllingly-coupled with earthmoving equipment. In any number of scenarios, external forces, such as acceleration and gravity, may act on the operator. The external forces may cause the operator to impart forces to the control device 10 in order to counteract the external forces. For example, the first applied force $AF^1$ may be produced by an operator using the control device 10 to stabilize their body as the earthmoving equipment traverses a downhill slope. As can be appreciated, it may be undesirable to create an input, such as an input that accelerates the equipment down the slope, in such a scenario. Accordingly, providing a control device 10 having an input locus 14 within the handle 12, as described herein, creates a static point of reference that can receive stabilizing forces without producing an unintended input.

Figure 1B:
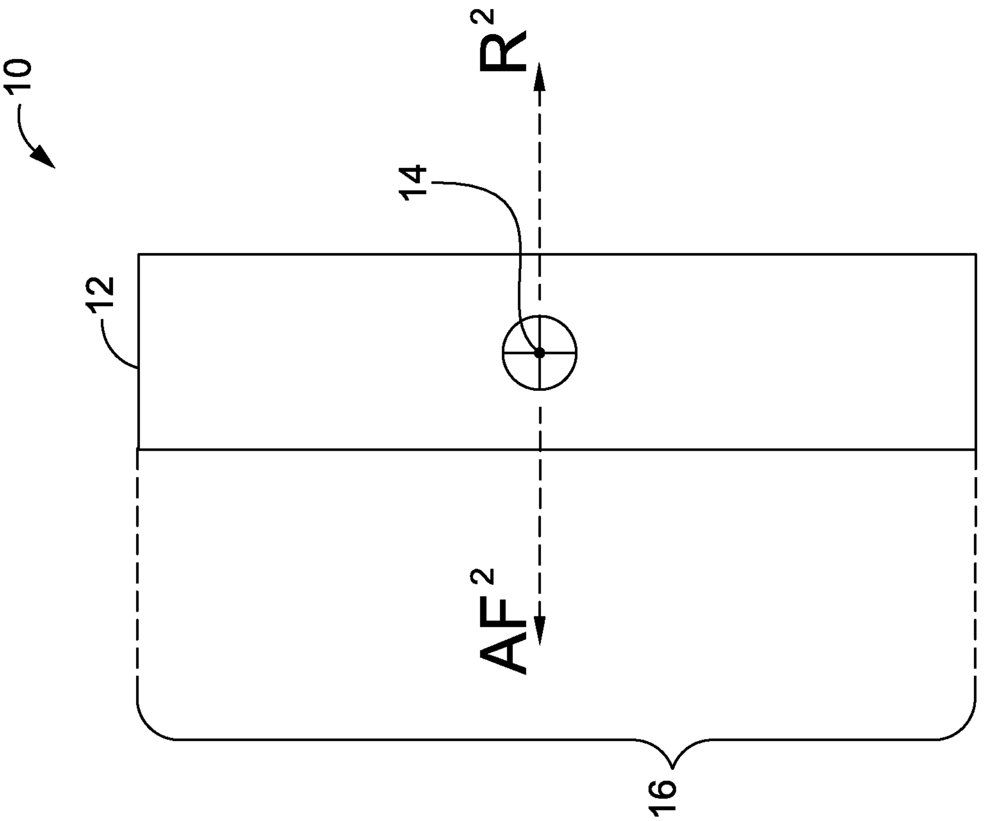

FIG. 1B depicts a second applied force $AF^2$ in a vector passing through the input locus 14 of the exemplary control device 10, in a direction opposite the first applied force $AF^1$. The second applied force $AF^2$ may correspond to a backward longitudinal force, which may be produced by a pulling motion of an operator. Such a force may be produced, for example, as the operator stabilizes themselves in response to acceleration of the earthmoving equipment or traversal of an uphill slope. As with the first applied force $AF^1$ described above, the second applied force $AF^2$ may result in an equal and opposite second reactive force $R^2$. As a result, the second reactive force $R^2$ prevents movement of the control device 10 and the generation of inputs. Although FIGS. 1A and 1B depict two examples of applied forces, the control device 10 may resist movement in response to applied forces passing through the input locus 14 in any direction. For example, the exemplary control device 10 may resist movement in response to radial, axial, and diagonal forces passing through the input locus 14.

Accordingly, it should be understood that the aspects herein provide a control device 10 having a fixed point within the operator-engagement region 16 that may receive stabilizing forces, without generating unwanted inputs. Said another way, the input locus 14 may prevent translational movement (e.g., forward, backward, side-to-side, diagonal, etc.) of the handle 12, yet allow rotational/pivotal movement of the handle 12 about the input locus 14.

Figure 2B:
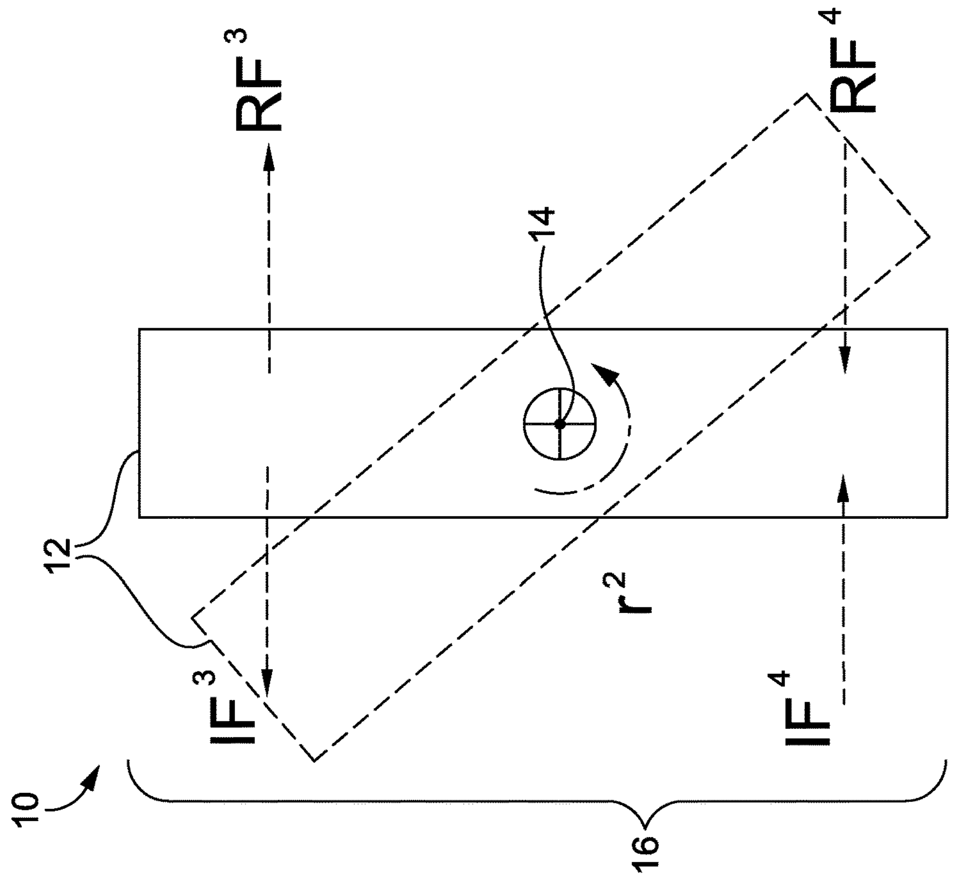
FIGS. 2A and 2B provide a diagrammatic depiction of the control device of FIGS. 1A and 1B, with exemplary input forces applied thereto, in accordance with aspects hereof.
Figure 2A:
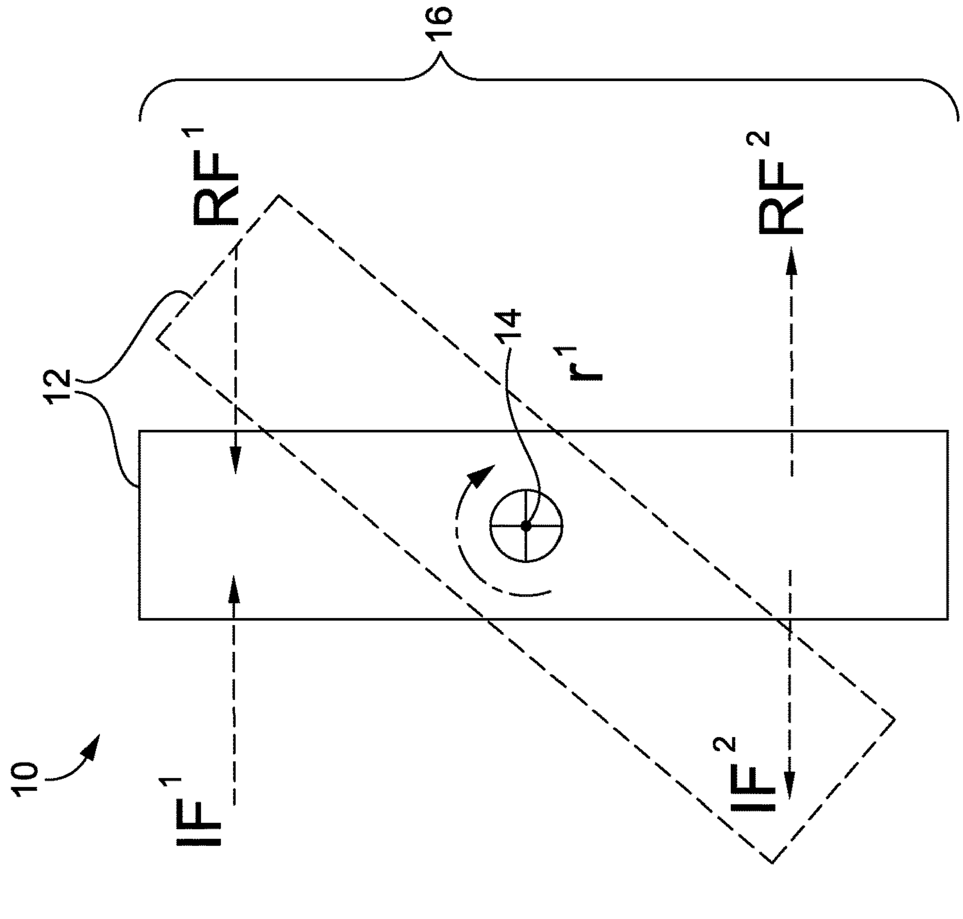

For example, FIGS. 2A and 2B depict an exemplary rotational movement of the control device 10 of FIGS. 1A and 1B, as a result of exemplary input forces applied thereto. The input forces may be forces applied to the operator-engagement region 16 in vectors that are offset from the input locus 14. That is, the input forces, such as first input force $IF^1$ (which may correspond to a forward longitudinal or pushing type of force), are forces applied in force vectors that do not pass through the input locus 14. As a result, when the input forces are greater than opposite resistive forces, such as first resistive force $RF^1$, an input, such as first rotational input $r^1$, is produced. Resistive forces may be produced, for example, by friction provided by return springs, friction packs, and any number of suitable mechanisms. Accordingly, as depicted in FIG. 2A, the first input force $IF^1$ is greater than the first resistive force $RF^1$, which causes the handle 12 to rotate about the input locus 14, producing the first rotational input $r^1$.

As can be appreciated, a second input force $IF^2$ applied to the operator-engagement region 16, may also result in the first rotational input $r^1$, when second input force $IF^2$ is greater than a second resistive force $RF^2$. The second input force $IF^2$ may be associated with a backward, or pulling type of force, that is offset from the input locus 14, resulting in the first rotational input $r^1$. Accordingly, the first rotational input $r^1$ may be produced by a pushing-type force applied to the operator-engagement region 16 above the input locus 14, a pulling-type force applied to the operator-engagement region 16 below the input locus 14, or both. Further, the degree of rotation about to the input locus 14 may determine the type and extent of input produced.

It should be appreciated that the first rotational input $r^1$ may correspond to an instruction that results in an action from a controlled element. For example, the first rotational input may correspond to an instruction to rotate a wheel or a track of a vehicle forward at a given speed. In another example, the first rotational input $r^1$ may correspond to an instruction to tilt an attachment of a piece of equipment downward. As can be appreciated, these examples are not intended to be limiting, rather, any type of control instruction can be associated with any type of input.

FIG. 2B depicts a third input force $IF^3$ and a fourth input force $IF^4$ applied to the operator-engagement region 16 in force vectors that are offset from the input locus 14. Similar to the input forces described above with FIG. 2A, when the third input force $IF^3$>third resistive force $RF^3$ and when the fourth input force $IF^4$ is greater than a fourth resistive force $RF^4$, a second rotational input $r^2$ may be generated. Accordingly, the control device 10 may be rotatable about the input locus 14 in more than one direction to produce various input and corresponding controls.

Continuing with the above examples of control instructions, the second rotational input $r^2$ may correspond to an instruction to rotate a wheel or a track of a vehicle backward at a given speed, or to tilt an attachment upward. It should be understood that multiple control devices 10 may be implemented with the same controlled-apparatus or device. For example, two control devices 10 may be positioned opposite one another on a vehicle, such as a stand-on zero-turn mower, as speed and/or directional controls. Accordingly, the first rotational input $r^1$ depicted in FIG. 2A may propel one wheel of the mower forward, while the second rotational input $r^2$ depicted in FIG. 2B may propel the other wheel backward, causing the mower to turn.

Figure 3B:
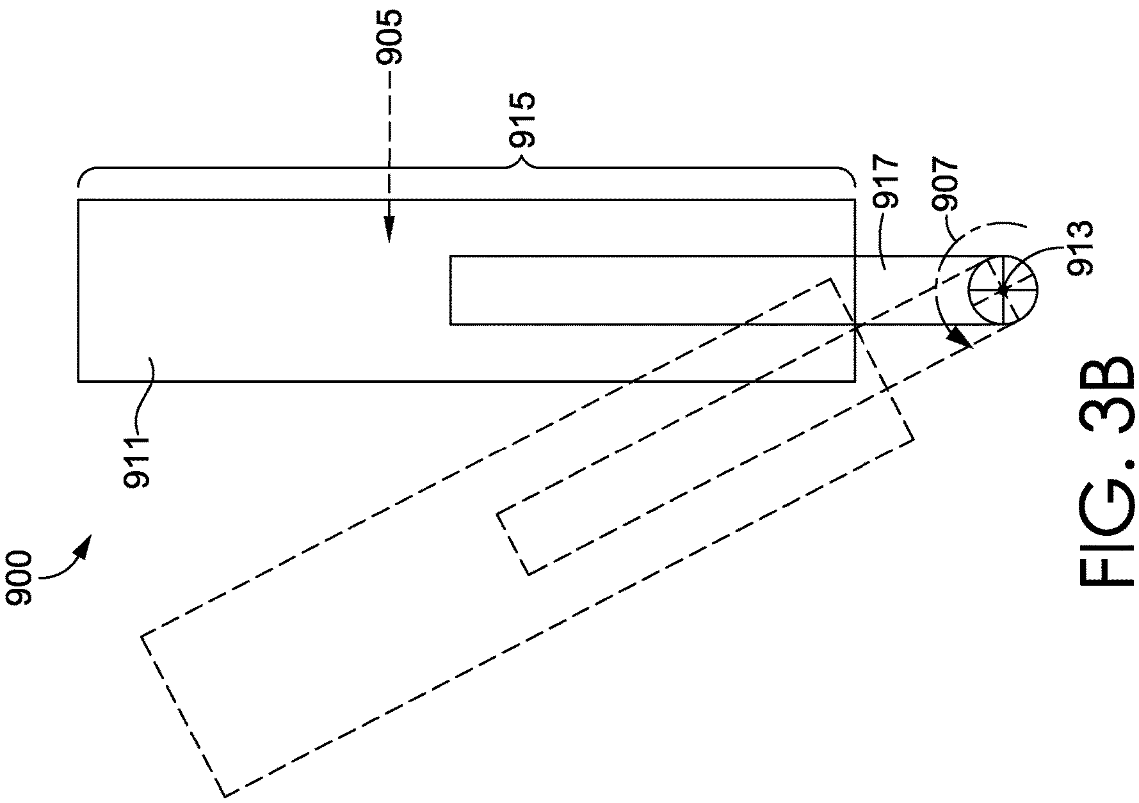
FIG. 3B PRIOR ART
FIGS. 3A and 3B depict a simplified illustration of a prior art control device.
Figure 3A:
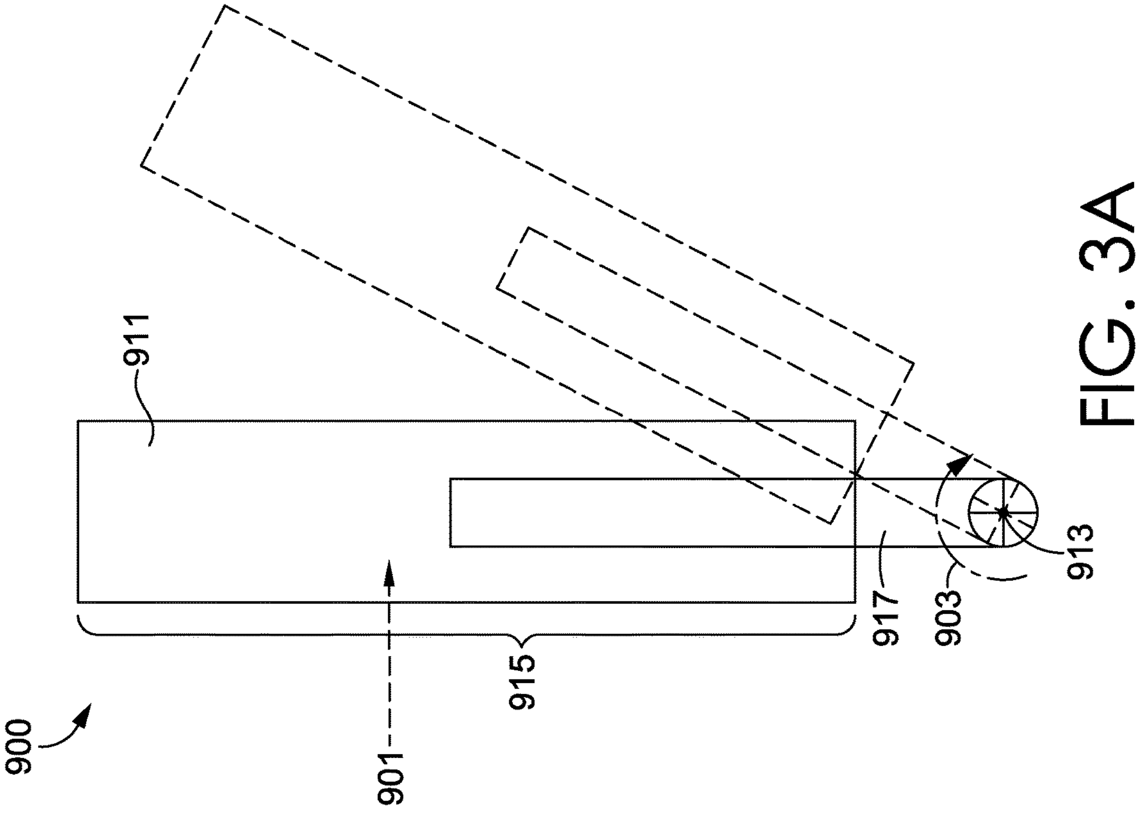
FIG. 3A PRIOR ART

Turning now to FIGS. 3A and 3B, a simplified depiction of a prior art control device 900, in this case a traditional joystick, is provided for comparison. The prior art control device 900 includes a handle 911, a shaft 917, and an engagement/input region 915. Further, the prior art control device 900 includes a pivot axis 913 positioned at a bottom end of the shaft 917, and external to the engagement/input region 915. The engagement/input region 915 corresponds to a portion of the prior art control device 900, such as the handle 911, that receives forces for producing inputs. Accordingly, a force applied at any point within the engagement/input region 915 causes an input. For example, a first force 901, when applied anywhere within engagement/input region 915, causes movement of the prior art control device 900 about pivot axis 913, resulting in a first input 903.

Forces, such as the first force 901, may be inadvertently applied to the prior art control device 900 as a result of external forces acting on an operator of a controlled-apparatus or device. In one example, deceleration of a vehicle controlled by the prior art control device 900 may result in a force that pushes the operator forward with respect the vehicle. As a result, the operator may reflexively push on the prior art control device 900 to counteract the deceleration forces and stabilize their position with respect to the vehicle. As can be appreciated, such a reflexive response may result in a force, such as the first force 901, which generates an unintended input, such as first input 903. Such an input may correspond to an unwanted instruction to accelerate the vehicle, which may make the operation of the vehicle more difficult.

Similarly, as depicted in FIG. 3B, a second force 905 in an opposite direction of the first force 901, causes a second rotation 907 about pivot axis 913, also resulting in an input. Further, although two exemplary forces are depicted, it should be appreciated that a force received in any direction that passes through the engagement/input region 915 causes rotation of the prior art control device 900 about the pivot axis 913. Continuing with the above example from FIG. 3A, the second force 905 may be generated in response to acceleration of a vehicle controlled by the prior art control device 900. Resultantly, the second force 905 may result in a second rotation 907, which may correspond to an unwanted instruction to decelerate the vehicle. Accordingly, in contrast to the control devices described herein, prior art control devices have failed to provide an input locus within engagement/input region 915 that resists forces passing therethrough. As a result, existing solutions may be prone to generating inadvertent inputs and resulting in unintended controls of devices and apparatuses with which they are associated.

Figure 4A:
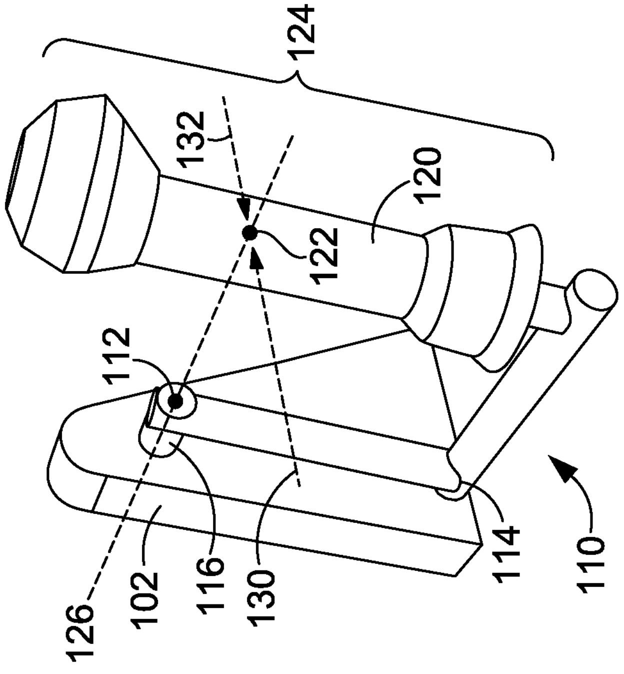
FIGS. 4A and 4B depict a perspective view of a first exemplary embodiment of a control device, in accordance with aspects hereof.

Turning now to exemplary embodiments of this disclosure, FIG. 4A depicts a first exemplary embodiment of a control device 100. The control device 100 provides one exemplary implementation of the concepts discussed hereinabove with reference to FIGS. 1A-2B. The control device 100 may have an input assembly 110 comprising a handle 120, a pivot arm 114, and a pivot shaft 116. The input assembly 110 may be rotatably coupled with a mount 102, which may be affixed to or incorporated in a controlled-apparatus or device. It should be appreciated that the configuration of the control device 100 depicted in the figures is exemplary only, and that the input assembly 110 may be coupled with the mount 102 via any number of suitable structures.

In one example, the pivot arm 114 may be coupled with a bottom end of the handle 120, or may be housed within the handle 120 such that the handle 120 fits about the pivot arm 114. The pivot arm 114 may be coupled with the mount 102, for example, via the pivot shaft 116. The pivot shaft 116 may extend laterally into the mount 102 and be rotatably coupled with the mount 102. The pivot shaft 116 may be rotatable about a rotational locus 112. Further, the pivot shaft 116 may be coupled with the mount 102 such that the pivot shaft 116 resists movement in any direction, other than rotational movement about the rotational locus 112.

The handle 120 may include an operator-engagement region 124, which generally corresponds to a portion of the control device 100 that can receive forces for producing inputs. For example, the operator-engagement region 124 may be a portion of the handle 120 that can be physically contacted by an operator to produce inputs. Further, an input locus 122 may be positioned within the operator-engagement region 124 and the handle 120. The input locus 122 may indicate a point in three-dimensional space relative to which the control device 100 moves to produce inputs. In some aspects, the input locus 122 may be positioned proximate a center point of the operator-engagement region 124, and/or proximate a point that corresponds to a center of an operator's palm. For example, a rotational axis 126, which passes through the input locus 122, may extend through a hand of an operator grasping the operator-engagement region 124 in a palmar-dorsal direction. By way of further example, the input locus 122 may be positioned at a center vertical and/or a center traverse position within the operator-engagement region 124.

Additionally, the input locus 122 may be positioned coaxially with (and spaced apart from) the rotational locus 112 in the rotational axis 126. Further, the pivot arm 114 may be rigid, or relatively rigid, so that the rotational locus 112 and the input locus 122 have a fixed position relative to one another. For example, the rotational locus 112 may have a fixed position that is proximate, or within, the mount 102, while the input locus 122 may be positioned external to the mount 102. As a result, the input assembly 110 may be rotatably coupled with the mount 102 about the rotational axis 126.

Accordingly, the control device 100 may provide an input assembly 110, including the handle 120, which is coupled with the mount 102 to resist movement in response to a force vector extending through the input locus 122. For example, a first applied force 130 may be applied in a force vector extending through the input locus 122. Because the rotational locus 112 has a fixed position, a first reactive force 132 may be generated as a result of the first applied force 130. Accordingly, the first reactive force 132 may counteract the first applied force 130, which prevents movement of the handle 120 and associated inputs.

Further, the control device 100 may be configured to have a rest, return, or neutral position. For example, as shown in FIG. 4A, the control device 100 may have a neutral position that is tilted slightly forward. However, it should be understood that the neutral position may be modified to provide an ergonomic fit depending on the implementation of the control device 100. As described herein, an operator generally operates a control device (e.g., control device 100) by causing the control device to rotate. Typically, rotation of the control device is accomplished by an operator grasping the handle (e.g., handle 120) and rotating their wrists to rotate the control device in the desired direction. Often, the operator can only comfortably rotate their wrists through a limited range of motion. Thus, the control device may rotate (or be limited to rotate) through a similar range of motion. For example, in some aspects the control device may rotate forward from neutral up to 40 degrees and may also rotate backward from neutral up to 25 degrees, which corresponds with an effective range of motion for an operator's wrist, in exemplary aspects. In order to improve comfort for operators of differing heights, some aspects of the control device may include an adjustable neutral position. For example, taller operators may prefer a neutral position that is rotated forward where the handle is tilting away from the operator and less upright while shorter operators may prefer a neutral position that is rotated backward where the handle is more upright. In exemplary aspects, the adjustable neutral position does not adjust an allowed range of motion provided by the handle. Instead, the full range of motion is maintained from the adjusted neutral position.

Figure 4B:
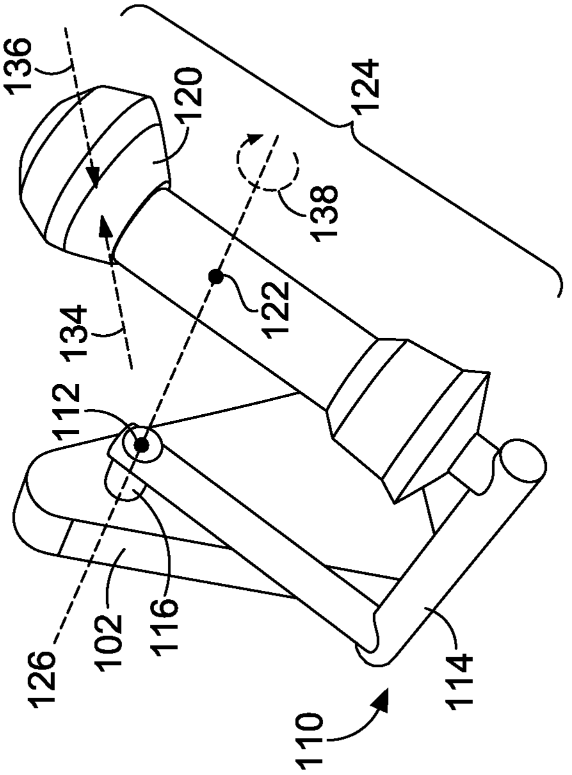

Turning now to FIG. 4B, the control device 100 is depicted with an exemplary input force 134 applied to the handle 120 in the operator-engagement region 124 and in a vector that is offset from the input locus 122. The exemplary input force 134 is greater than an exemplary resistive force 136, which causes the handle 120 to rotate about the input locus 122, producing an exemplary rotational input 138. Additionally, because the input locus 122 has a fixed position relative to the rotational locus 112, the exemplary rotational input 138 is the only input generated by the exemplary input force 134. Accordingly, the input locus 122 and the rotational locus 112 maintain a coaxial relationship as the exemplary rotational input 138 is generated.

It should be appreciated that rotation and inputs of the input assembly 110 may be detected via any number of suitable mechanisms and used to generate controls for the controlled-element. For example, any number of sensors may be employed to determine rotation of the input assembly 110 about the rotational axis 126. In one exemplary aspect, the mount 102 may include the sensors and computing components such as processors, computer storage media, and associated logic for determining controls. In other aspects, the control device 100 may be coupled with components of the controlled device, such as hydraulics or hydrostatic transmissions, or an apparatus to produce manually-detected controls. In embodiments having more than one control device 100 (as depicted in FIGS. 5A and 5B and indicated by reference numerals 100 and 101), it should be appreciated that inputs may be detected independently from each control device 100, even when the control devices share a common rational axis.

The control device 100 may also be described in terms of axes, such as a lateral axis, a longitudinal axis, and a vertical axis, each having an origin at the input locus 122. For example, the rotational axis 126 may correspond to a lateral axis and each of the longitudinal and vertical axes may have an origin that intersects the rotational axis 126 at the input locus 122. Accordingly, the input assembly 110, including the handle 120, may be coupled with the mount 102 to resist movement in the longitudinal axis and the vertical axis.

Figure 5A:
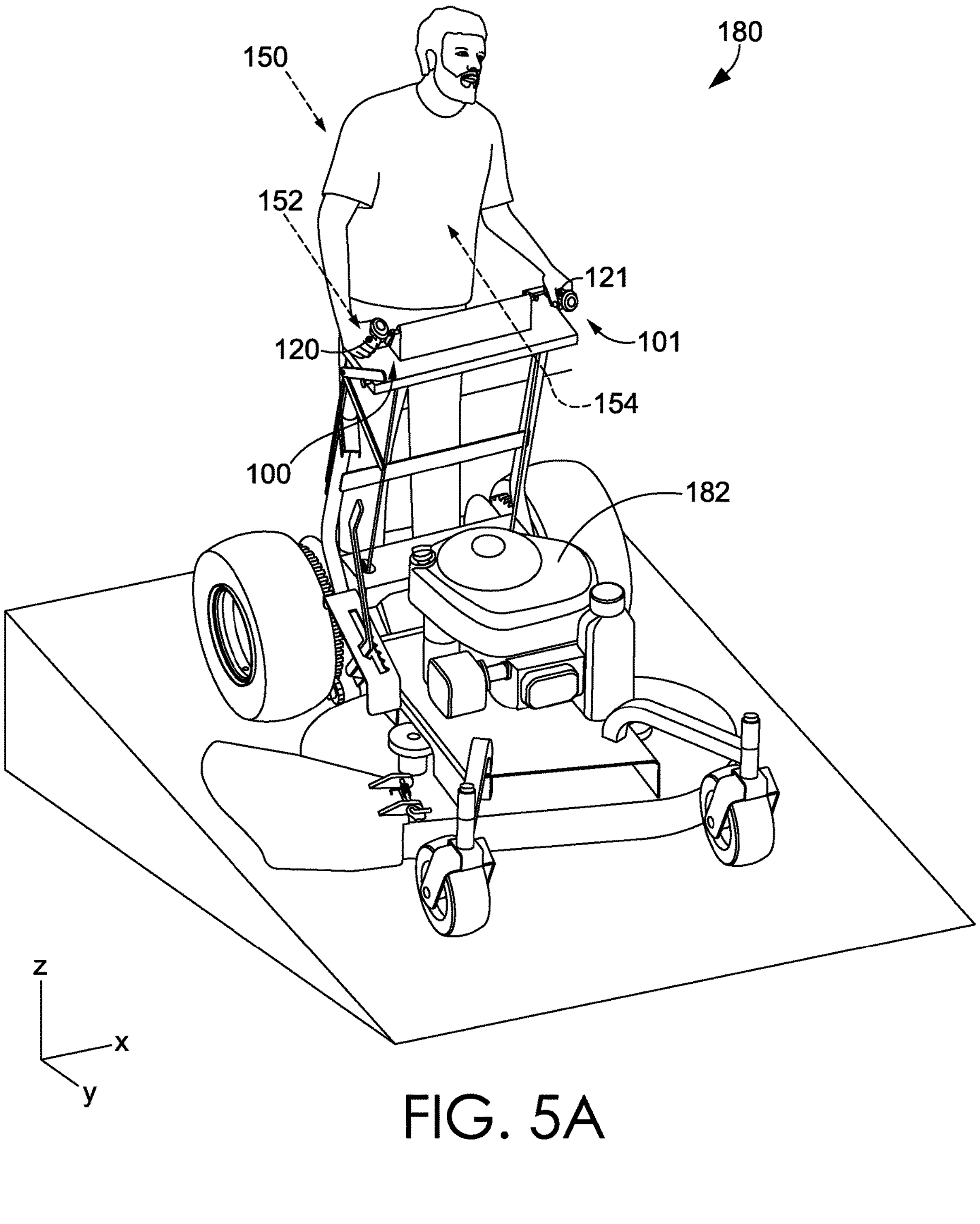
FIG. 5A depicts a perspective view of an exemplary implementation the control device according to FIGS. 4A and 4B, in accordance with aspects hereof.
Figure 5B:
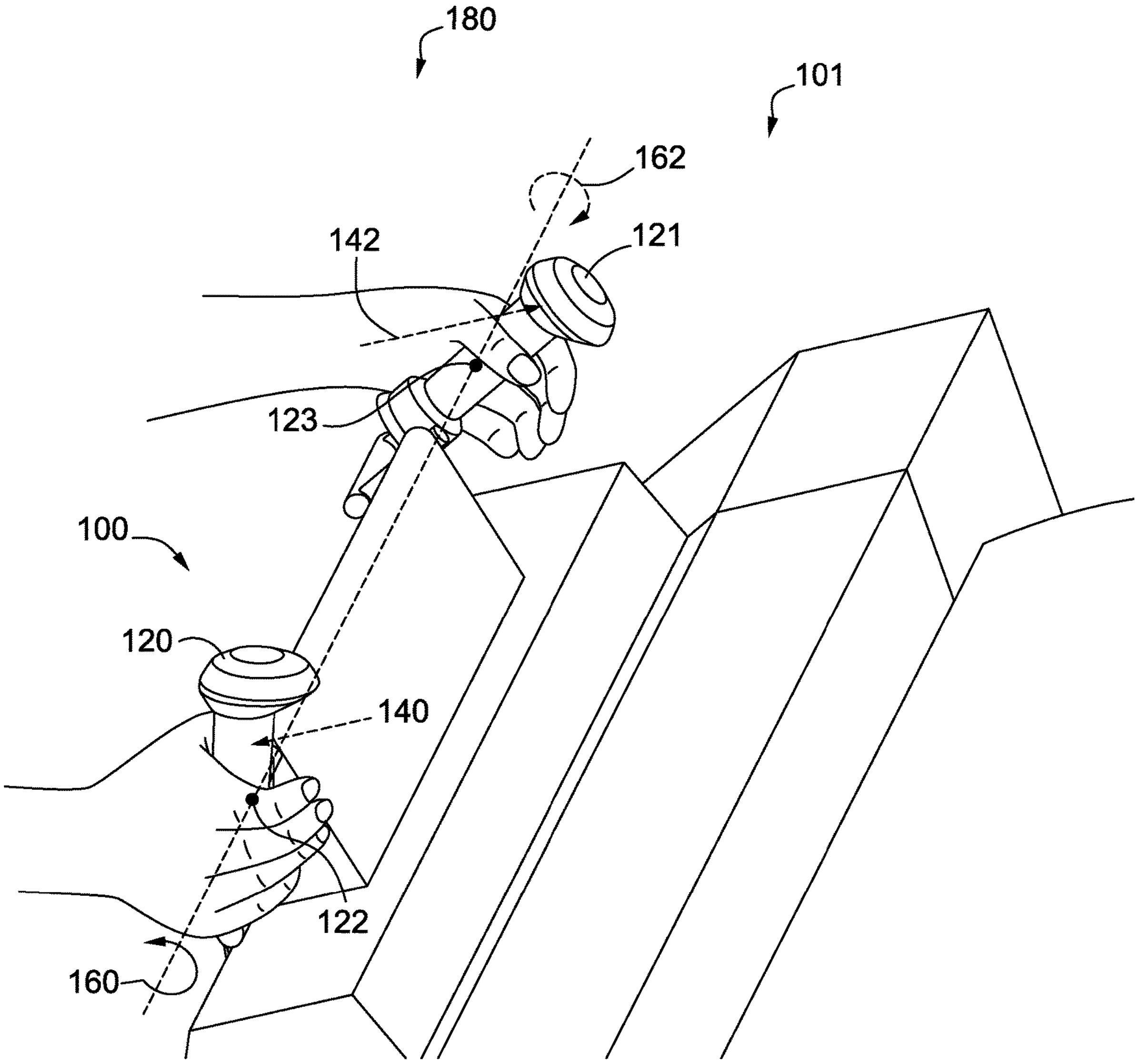
FIG. 5B depicts an enlarged, partial perspective view of the exemplary implementation of FIG. 5A, in accordance with aspects hereof.

FIG. 5A depicts an exemplary implementation 180 of control device 100. Specifically, FIG. 5A shows two control devices (a first control device 100 and a second control device 101) affixed to a stand-on mower 182. Additionally, the exemplary implementation 180 illustrates an exemplary use scenario, with the stand-on mower 182 on an inclined surface. In this exemplary use scenario, the operator may be subjected to external forces, such as gravitational and acceleration forces created by the orientation and movement of the stand-on mower 182. For example, an external force 150 may cause the operator to move toward the stand-on mower 182 in the direction of the external force 150. Accordingly, the external force 150 may cause the operator to push forward on the control devices 100 and 101. Using previous control devices, such as the prior art joystick 900 (shown in FIGS. 3A and 3B), the pushing force from the operator may result in an unwanted input that causes the stand-on mower to accelerate.

As can be appreciated, in order to remain standing on the stand-on mower 182, the operator has to provide a counterforce having a magnitude at least as great as a magnitude of the external force 150. Accordingly, the operator may apply a stabilizing force 152 in a vector passing through the input locus 122. Because the input locus 122 has a fixed position, the stabilizing force 152 results in a responsive force 154 that counteracts the external force 150. Said another way, the stabilizing force 152 results in a responsive force 154 greater than or equal to the external force 150. Resultantly, the operator may maintain or modify their position relative to the stand-on mower 182, while continuing to engage the operator-engagement region 124 of the handle 120 (as shown in FIGS. 4A and 4B). Further, because the control device 100 resists movement in response to forces applied in vectors passing through the input locus 122, the operator may apply the force required to counter the external force 150 directly to the control device 100, without generating unwanted inputs. Said another way, an operator may push forward on the control device 100 (and control device 101) without generating an unwanted input.

FIG. 5B depicts an enlarged, partial view of the exemplary implementation 180 of FIG. 5A, having input forces applied thereto. For clarity, the forces depicted in FIG. 5A (e.g., external force 150, stabilizing force 152, and responsive force 154) have been hidden in FIG. 5B. However, it should be understood that the forces depicted in FIG. 5A may be applied concurrently with the input forces depicted in FIG. 5B. A first input force 140 may be applied to the control device 100 at the handle 120 in a force vector that is offset from the input locus 122. As a result, the input assembly 110 (as shown in FIGS. 4A and 4B) may rotate about the input locus 122 to generate the first rotational input 160. Additionally, a second input force 142 may be applied to the second control device 101, resulting in a second rotational input 162. It should be appreciated that the second rotational input 162 and the first rotational input 160 may be generated (and corresponding controls) simultaneously. Further, it should be understood that the input forces 140 and 142 may be applied simultaneously with the stabilizing force 152 (as depicted in FIG. 5A). Accordingly, input forces and stabilizing forces may be applied to the control devices at the same time, while only generating inputs in response to the input forces. As a result, unintended inputs may be reduced or eliminated. Resultantly, the operator may stabilize their body while simultaneously generating inputs for controlling the equipment.

In some aspects the control device 100 provides for a linear response as the handle 120 is rotated. That is, the response produced by rotation of the control device is uniform across the entire range of motion. For example, rotating the control device from the neutral position to 10 degrees will produce an equivalent response as rotating the control device from 20 degrees to 30 degrees. For example, an amount in velocity change of the vehicle resulting from the first 10 degrees of motion is equivalent to an amount in velocity change resulting from the next 10 degrees of motion.

In other aspects it is advantageous to configure the control device 100 to produce a non-linear response. That is, the response produced by rotation of the control device is not uniform across the entire range of motion. For example, in an aspect where the control device is configured to rotate forward up to 40 degrees from the neutral position, a first portion of rotation (e.g., from the neutral position to 10 degrees) may produce less response per degree of rotation while a second portion of rotation (e.g., from 11 degrees to 40 degrees) may produce more response per degree of rotation. This may be advantageous in many aspects where fine control of the initial response is beneficial. For example, in the exemplary implementation 180 it may be advantageous to configure the control device 100 to produce a non-linear response. A stand-on mower often has to maneuver around obstacles (e.g., landscaping, fences, other fixtures, etc.) while trimming, which is typically done at lower speeds. Controlling the stand-on mower of the exemplary implementation 180 at lower speeds may be more easily done if the control device 100 has a non-linear response. That is, an operator may be able to more easily control the stand-on mower at lower speeds if the control device 100 produces less acceleration over a larger portion of the range of initial control device 100 motion. For example, it may be easier to control the acceleration needed for lower speed operation with a non-linear response than with a linear response because there will be an increased range of motion of the control device 100 for the operator to utilize for a common end result (e.g., neutral to 10 degrees of control device 100 motion to achieve trimming speed instead of neutral to 2 degrees of control device 100 motion to achieve the same trimming speed).

Many ways of configuring the control device 100 to produce a non-linear response are contemplated herein. In one aspect, the control device may be mechanically connected with a drive unit (e.g., a hydrostatic drive). For example, one or more linkages may couple the control device 100 to the drive unit. The particular geometries and placement of the one or more linkages may control the drive unit in a non-linear fashion. For example, a linkage connecting the control device 100 to the drive unit may be moved through an arcuate path in response to rotation of the control device 100. The arcuate movement of this linkage may contain a vertical component and a horizontal component. The connection between this linkage and the drive unit may be such that only the vertical component of the movement produces a response from the drive unit. Thus, as the control device 100 moves the linkage through the arcuate motion, the vertical component changes in a non-linear fashion and thus a non-linear response may be produced by the drive unit.

In another aspect, the control device 100 may be electrically coupled (e.g., drive-by-wire) with the drive unit. Whether as a result of software or circuitry, the control device 100 may be configured to produce a non-linear response. For example, a sensor may detect the rotation or distance offset of the control device 100 and may transmit a signal to a controller. In response to receiving the signal, the controller may cause the drive unit to produce a response. The controller may be directly coupled or even integral with the drive unit. The controller may also be coupled with mechanical linkages, which are themselves in turn coupled to the drive unit.

Figure 6B:
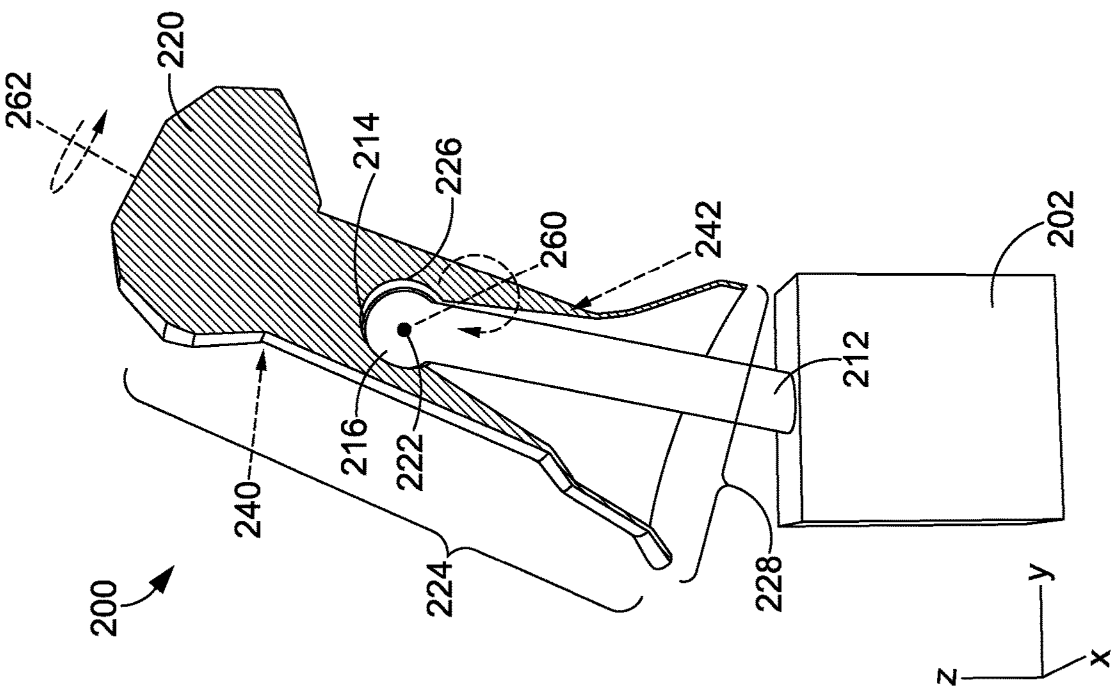
FIGS. 6A and 6B depict partial cutaway perspective views an exemplary embodiment of a joystick-type control device, in accordance with aspects hereof.
Figure 6A:
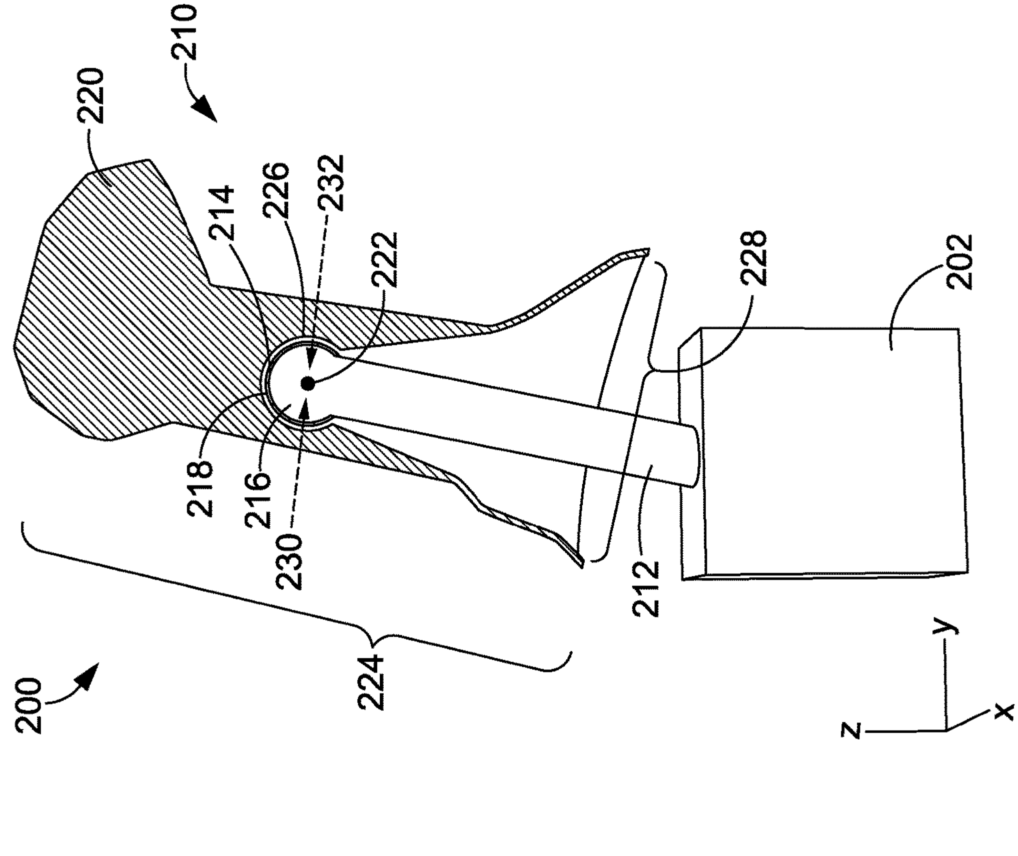

Turning now to FIG. 6A, another exemplary embodiment of a control device is shown. In this exemplary embodiment, the control device may be a joystick-type device, such as joystick 200. The joystick 200 may include a base 202 that may be affixed to or integrated with a controlled-apparatus or device. The joystick 200 may also include a rod 212 extending from the base 202. In one aspect, the rod 212 may be rigid, such that the rod 212 has a fixed position relative to the base 202. For example, as shown here, the rod 212 may have a fixed angle relative to the base 202. In other aspects, however, the angle of the rod 212 relative to the base 202 may be adjustable to a desired angle.

Additionally, the joystick 200 may include a handle 220 that is pivotably coupled with the rod 212. In some aspects, the handle 220 may be configured to fit about or around the rod 212. In one aspect, the handle 220 may be pivotably coupled with the rod 212 at a distal end of the rod 214. For example, the distal end of the rod 214 may comprise a ball 216 and the handle 220 may include a socket 226, configured to mate with the ball 216. Accordingly, in one exemplary aspect, the coupling between the rod 212 and the handle 220 may be a ball-and-socket type coupling. However, it should be understood that any suitable means of coupling the rod 212 and the handle 220 is considered within the scope of this disclosure. In one aspect, the joystick 200 may be configured such that the rod 212 extends to a point proximate a center of the handle 220. Additionally, the rod 212 may be positioned within the handle 220 such that the distal end of the rod 214 is positioned at a location corresponding to a portion of the handle 220 configured to align with a palm of an operator. It should be appreciated that other configurations are possible, and that the pivotable coupling may be positioned at any desired location within the handle 220.

Additionally, the joystick 200 may comprise an operator-engagement region 224, which may correspond to a portion of the handle 220 that may be contacted by an operator to produce inputs. For example, the operator-engagement region 224 may be a portion of the handle 220 that may be grasped by the operator to manipulate the joystick 200. Additionally, the handle 220 may comprise a cavity 228 that flares or tapers outward from the pivotable coupling toward a bottom of the handle 220. As a result, the cavity 228 may provide a space or void that allows for movement of the handle 220 around the rod 212 to produce inputs.

Additionally, the joystick 200 includes an input locus 222, within the operator-engagement region 224 and which may be positioned proximate, or within, the distal end of the rod 212. In one aspect, the input locus 222 may be a point about which the handle 220 pivots to produce inputs. Further, the input locus 222 may have a fixed position that is external to the base 202. For example, the rod 212 may provide rigidity that maintains the fixed position of the input locus 222. Accordingly, the joystick 200 may resist movement in response to forces, such as first applied force 230, applied to the handle 220 in force vectors passing through the input locus 222. For example, a first reactive force 232 may be produced in response to the first applied force 230. As a result, the first reactive force 232 may counteract the first applied force 230 to prevent movement of the joystick 200 in response to the first applied force 230. It should be appreciated that the first applied force 230 and the first reactive force 232 are exemplary in nature, and that the joystick 200 resists movement in response to forces applied in any vector passing through the input locus 222.

Further, the joystick 200 may comprise one or more sensors 218, for detecting movement of the handle 220 relative to the input locus 222. In a non-limiting example, optical, inductive, and Hall-effect sensors 218, among others, may be used to detect movement of the joystick 200. Further, although sensors 218 are depicted here at the distal end of the rod 214, it should be understood that other configurations with the sensor 218 at varying locations have been contemplated and are considered within the scope of this disclosure. For example, one or more sensors 218 may be positioned proximate a bottom edge of the handle 220, distributed within the cavity 228, or along the rod 212.

FIG. 6B depicts the joystick 200 of FIG. 6A with exemplary input forces applied in the operator-engagement region 224. For example, a first input force 240 may be applied to the handle 220 in a force vector that is vertically offset from the input locus 222. The first input force 240 may cause the handle 220 to rotate or pivot about the input locus 222 thereby creating a first rotational input 260. Additionally, a second input force 242 may be applied to the control device joystick 200 in the operator-engagement region 224 in a vector that is offset from the input locus 222, resulting in a second rotational input 262.

It should be understood that input forces 240 and 242 are exemplary only and that input forces may be applied to the operator-engagement region 224 at any number of angles and directions. Accordingly, the joystick 200 may produce inputs in multiple axes. As a result, the joystick 200 may be used to control multi-dimensional functionalities of a controlled element. For example, a single joystick 200 may control both a speed (e.g., via the first rotational input 260) and a direction of travel (e.g. the second rotational input 262) of a vehicle.

The joystick 200 may also be described in terms of a lateral axis, a longitudinal axis, and a vertical axis, each having an origin at the input locus 222. The handle 220 may be pivotable about the input locus 222 in each of the lateral, the longitudinal, and the vertical axes.

Figure 7A:
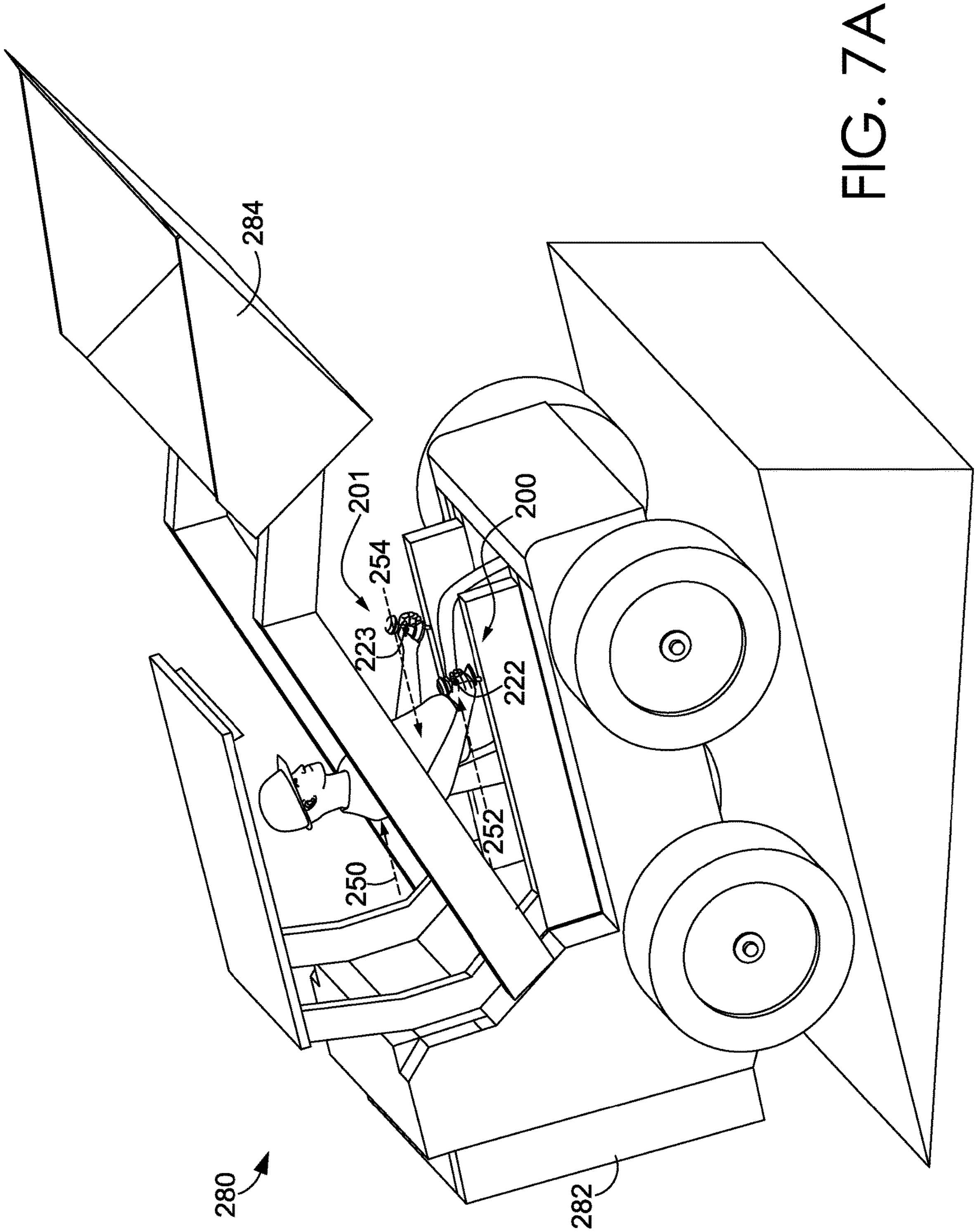
FIG. 7A depicts a perspective view of an exemplary implementation of the joystick of FIGS. 6A and 6B, in accordance with aspects hereof.

FIG. 7A provides an exemplary implementation 280 of the joystick 200 with an exemplary piece of equipment, in this case a skid steer loader 282. As with the other embodiments described herein, the multiple joysticks 200 may be used to control the skid steer loader 282. For example, this exemplary implementation 280 employs two joysticks, a first joystick 200 and a second joystick 201. In operation, equipment, such as the skid steer loader 282 may be used on a variety of terrain, such as on a downward slope, as shown here. As can be appreciated, the skid steer loader 282 may resist forces caused by the terrain and forces caused by acceleration/deceleration of the skid steer loader 282 by increasing friction, such as by providing additional torque via the wheels. However, the operator may be subjected to similar forces, such as external force 250, which may destabilize or jostle the operator. Using a conventional joystick (for example, as depicted in FIGS. 3A and 3B) the operator cannot apply a stabilizing force 252 at the joystick without producing an inadvertent input. For example, the operator may reflexively exert force upon the joystick in response to the external force 250 such as pushing on the controls to counteract the external force 250. With conventional control devices, such a reflexive response or stabilizing force 252 applied by the operator may result in an inadvertent input, which may, for example, produce a command that causes the skid steer loader 282 to accelerate, or to raise/tilt a bucket 284. As can be appreciated, such inadvertent inputs may be undesirable, particularly when traversing the difficult terrain.

Conversely, joysticks 200 and 201 provide input loci 222 and 223 at fixed positions within their respective handles 220. Said another way, the input loci 222 and 223 may provide rigid reference points that allow the operator to stabilize themselves relative to the skid steer loader 282, without inadvertently accelerating or destabilizing a load carried by the skid steer loader. For example, the operator may apply a stabilizing force 252 in a vector passing through the input locus 222. Resultantly, a responsive force 254, which counteracts the external force 250, may be produced, thereby stabilizing the operator.

Figure 7B:
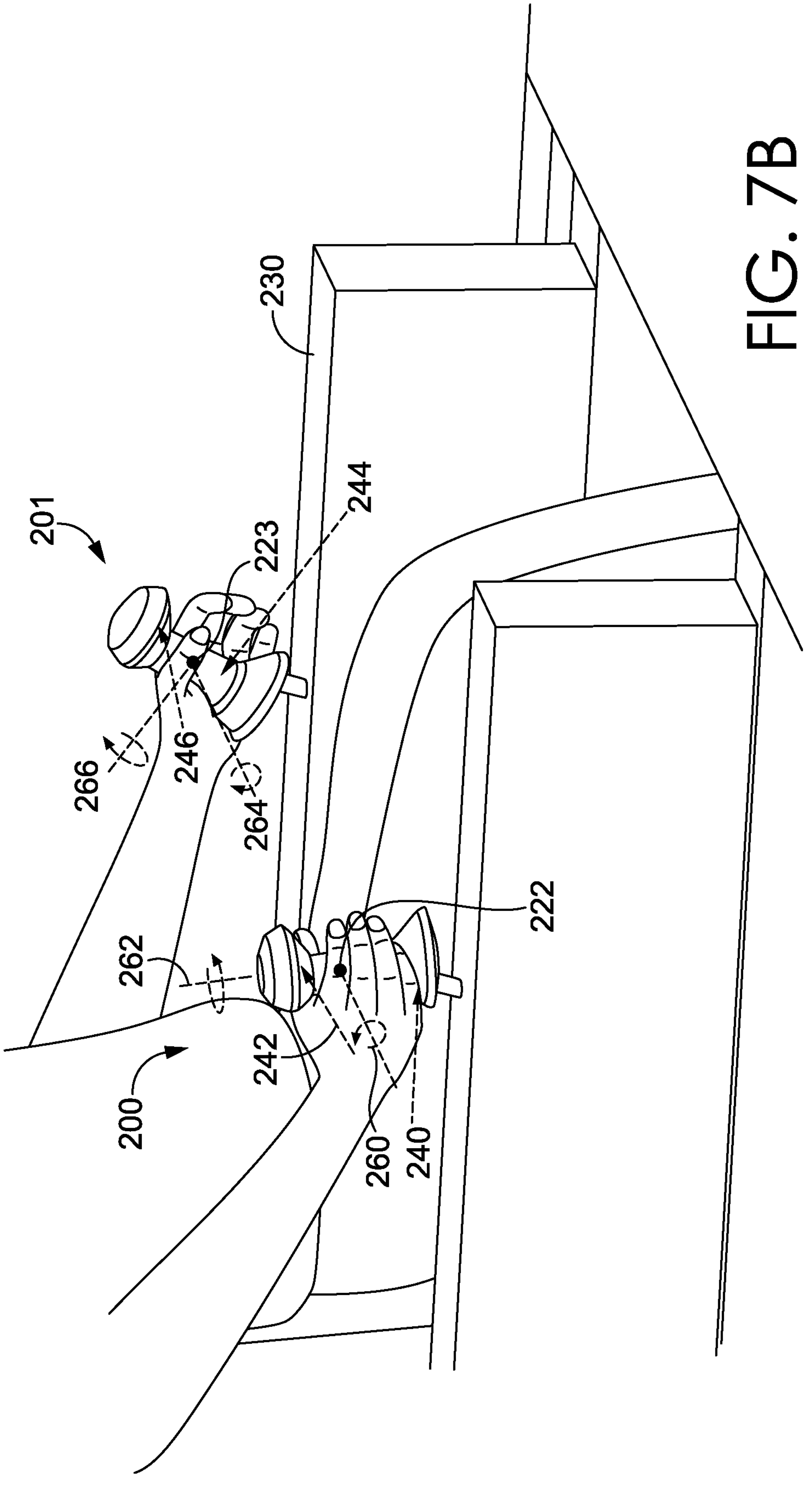
FIG. 7B depicts an enlarged, partial perspective view of the exemplary implementation shown in FIG. 7A, in accordance with aspects hereof.

FIG. 7B is a close-up view of the exemplary piece of equipment shown in FIG. 7A, having exemplary input forces applied thereto. For clarity, the forces depicted in FIG. 7A (e.g., external force 250, stabilizing force 252, and responsive force 254) have been hidden in FIG. 7B. However, it should be understood that the forces depicted in FIG. 7A may be applied concurrently with the input forces depicted in FIG. 7B. The first input force 240 may be applied to the operator-engagement region 224 of the handle 220 (indicated by reference numerals 224 and 220, respectively, in FIGS. 6A and 6B) in a vector that is offset (e.g., vertically offset) from the input locus 222. In response to the first input force 240, the joystick 200 may rotate about the input locus 222 to produce a first rotational input 260, which may correspond, in one example, to an input control that reduces the speed of the skid steer. A second input force 242 may be applied to the handle 220 in a vector that is offset (e.g., longitudinally offset) from the input locus 222. In response to the second input force 242, the joystick 200 may rotate about the input locus 222 to produce a second rotational input 262, which may correspond to an input control that turns the skid steer (e.g., to the left, relative to the operator).

In aspects, a third input force 244 may be applied to the joystick 201 in a vector that is offset (e.g., vertically offset) from a second input locus 223. A resultant third rotation 264 may be produced in response to the third input force 244. The third rotation may correspond to an input control that causes the bucket 284 (indicated by reference numeral 284 in FIG. 7A) to lower. Further, a fourth input force 246 may be applied to the handle 221 in a vector that is offset (e.g., longitudinally offset) from the second input locus 223, resulting in a fourth rotation 266. The fourth rotation 266 may, for example, correspond to an input control that causes the bucket 284 to tilt upward.

Accordingly, the joysticks 200 and 201 described with reference to FIGS. 6A-7B may produce inputs in multiple axes, yet resist movement in response to forces applied to the joysticks 200 and 201 in vectors extending through the input loci 222 and 223. As a result, the joysticks 200 and 201 may be used to control multi-dimensional functionalities, such as speed/direction and raise/tilt functionalities of a skid steer loader 282, while simultaneously providing resistance to stabilizing forces without generating unintended inputs.

Figure 8A:
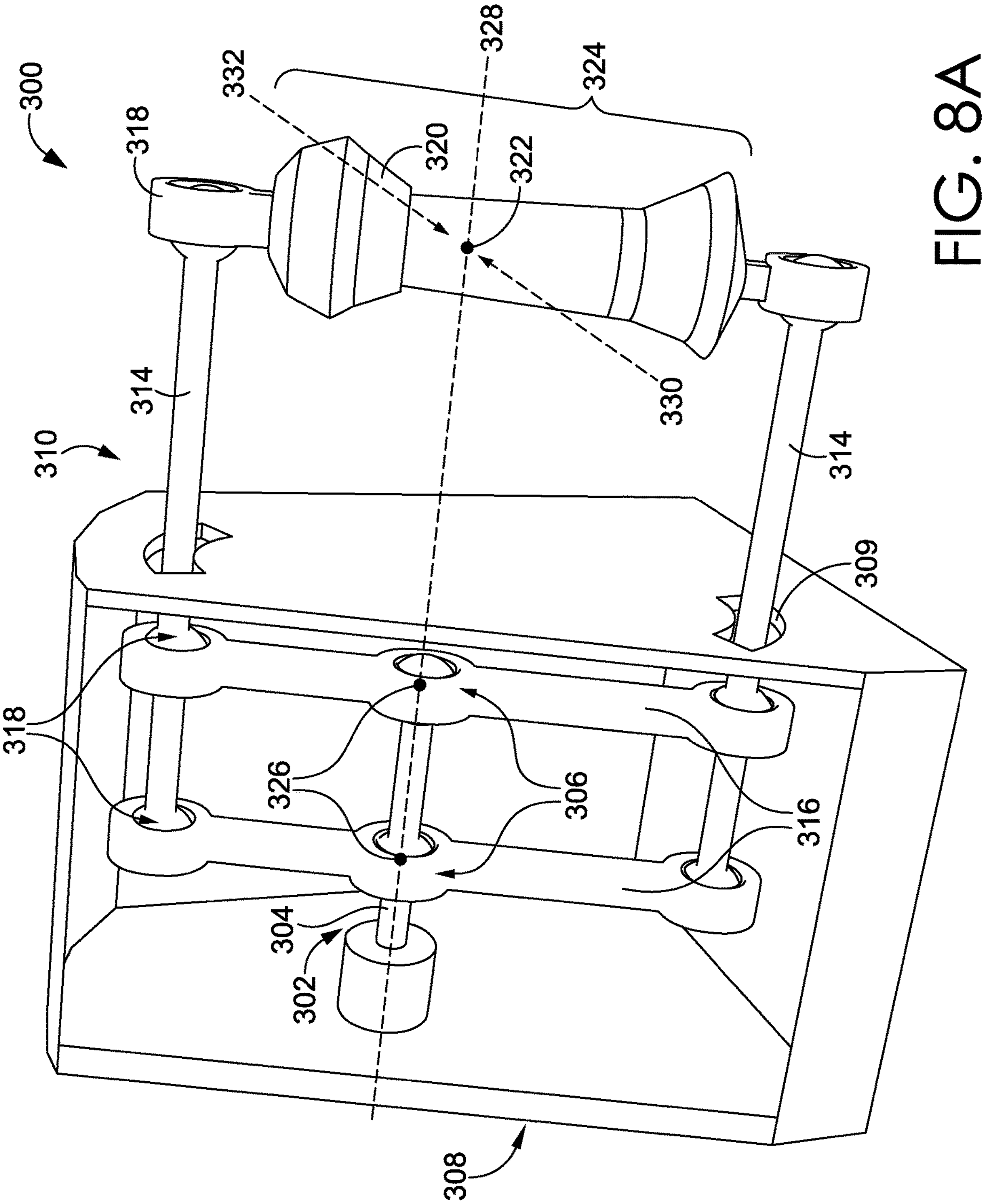
FIGS. 8A and 8B depict perspective views of yet another exemplary embodiment of control device, in accordance with aspects hereof.

FIG. 8A depicts yet another exemplary embodiment of a control device 300, with some portions hidden for clarity. The control device 300 may include an input assembly 310, which may comprise a handle 320, pivot arms 314, and connecting links 316. The input assembly 310 may include an operator-engagement region 324, which corresponds to a portion of the control device 300, such as the handle 320, which can receive forces for producing inputs. The control device 300 also includes an input locus 322, which is positioned within the operator-engagement region 324 and the handle 320. Distal ends of the handle 320 may be coupled with the pivot arms 314, for example, via spherical or ball joints, or other multi-axial coupling, such as joints 318. The pivot arms 314 may also be coupled with connecting links 316, via joints 318. Additionally, the connecting links 316 may be coupled with the mount assembly 302, for example, about a retaining shaft 304. Further, each of the connecting links 316 may be parallel one another, such that a distance therebetween remains constant.

The mount assembly 302, including the retaining shaft 304, may be rigidly coupled with a housing 308 or with a controlled-apparatus or device. For example, the housing 308 may be coupled with a portion of a controlled-apparatus, or the mount assembly 302 may be mounted to the controlled-apparatus at a control tower or panel. Accordingly, the mount assembly 302 may have a fixed position relative to the controlled-apparatus. The connecting links 316 may be coupled with the retaining shaft 304, such that they resist translational movement relative to the retaining shaft 304, yet are pivotable about one or more pivot loci 326. The pivot loci 326 may be located proximate a center point of the coupling between the connecting links 316 and the retaining shaft 304. Further, the pivot loci 326 may be positioned coaxially with the input locus 322 in a pivot axis 328.

Accordingly, the control device 300 may resist movement in response to forces applied to the operator-engagement region 324 and in vectors passing through the input locus 322. For example, an applied force 330 may be applied to the operator-engagement region 324 in a vector passing through the input locus 322. As can be appreciated, because the retaining shaft 304 maintains the coaxial relationship of the pivot loci 326, and the input locus 322 is coaxial with the pivot loci 326 in the pivot axis 328, the applied force 330 may effectively be imparted to the retaining shaft 304. As a result, the rigidity of the retaining shaft 304 may provide a reactive force 332, preventing movement of the handle 320 in response to the applied force 330. Further, it should be understood that the structure depicted in the figures is exemplary only, and that the other ways of providing the control device 300 having an input locus 322 as described are possible.

Figure 8B:
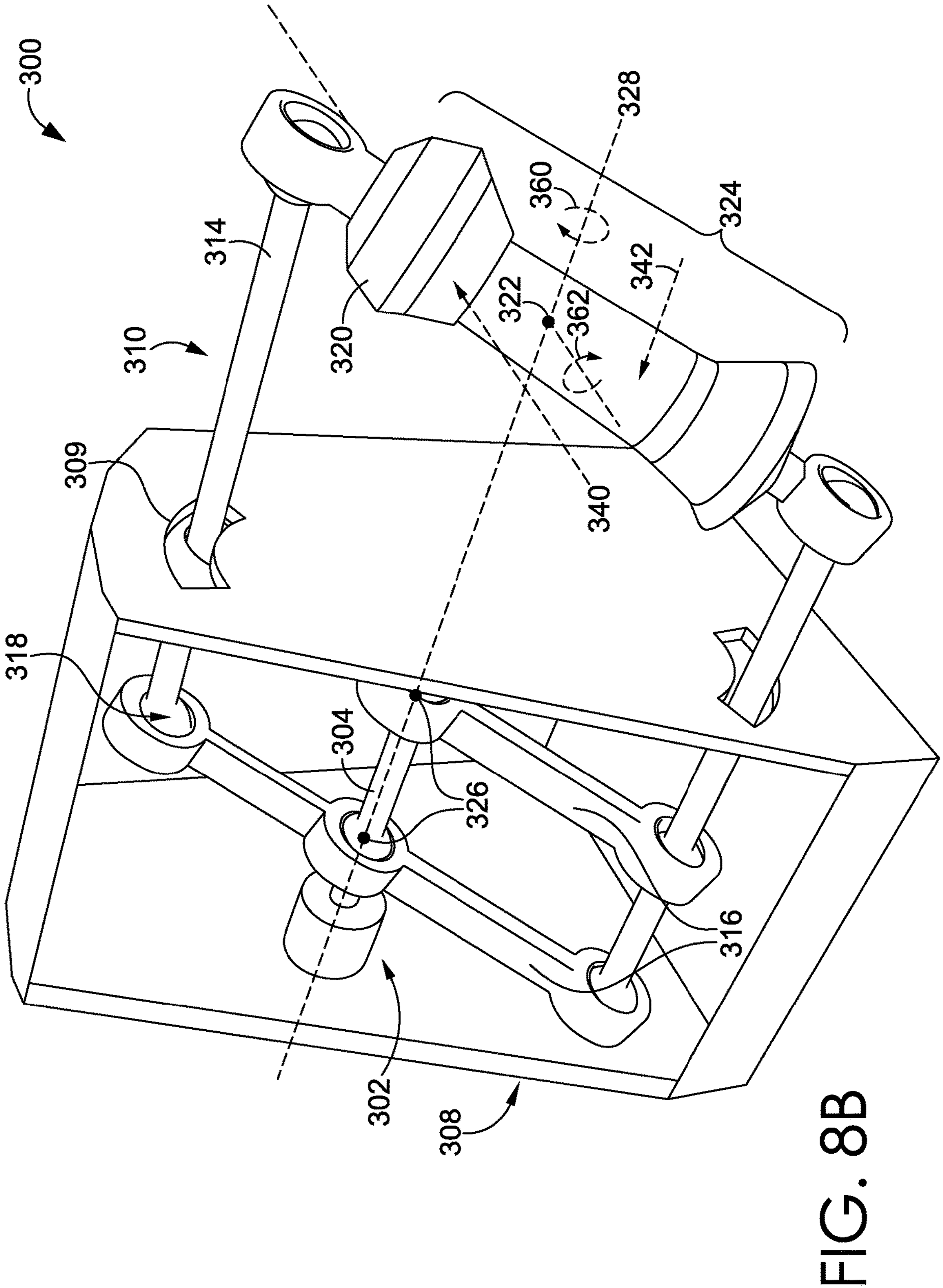

Turning now to FIG. 8B, the control device 300 of FIG. 8A is depicted with input forces applied thereto. For example, a first input force 340 may be applied to the operator-engagement region 324 in a vector that is offset from the input locus 322. Accordingly, a first rotational input 360 may be produced. Additionally, a second input force 342 may be applied in the operator-engagement region 324 in a vector that is offset from the input locus 322, resulting in a second rotational input 362. Accordingly, the input assembly 310, including the handle 320, may pivot relative to the pivot loci 326 and the input locus 322 in two axes. For example, the first rotational input 360 may correspond to a pivot about a lateral axis and the second rotational input 362 may correspond to a pivot about a longitudinal axis. It should be understood, however, that the pivot loci 326 and the input locus 322 maintain a fixed, coaxial relationship with one another as the input assembly 310 pivots to produce the first rotational input 360 and the second rotational input 362. Further, the housing 308 may include guides 309, which may provide a space in the housing 308 that allows the pivot arms 314 to move relative to the pivot loci 326. For example, the guides 309 may provide a space that allows forward/backward movement of the input assembly 310, and up/down movement due to the change in geometry of the input assembly 310 as a result of the second rotational input 362.

Figure 9A:
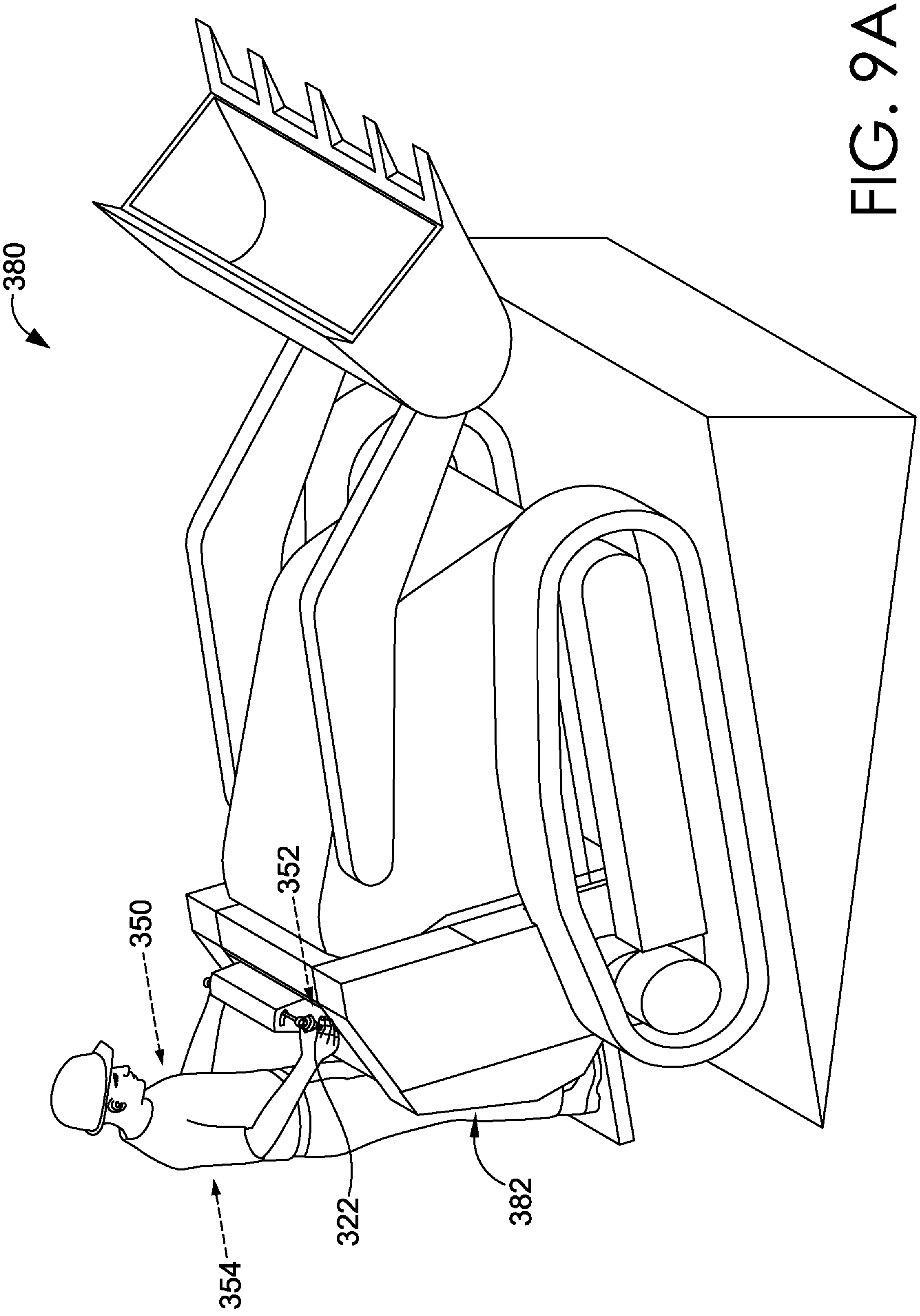
FIG. 9A depicts a perspective view of an exemplary implementation of the control device of FIGS. 8A and 8B, in accordance with aspects hereof.

FIG. 9A depicts an exemplary implementation 380 of control device 300. Specifically, FIG. 9A shows two control devices 300 affixed to a stand-on track loader 382. Additionally, the exemplary implementation 380 illustrates an exemplary use scenario, with the stand-on track loader 382 on an inclined surface. In this exemplary use scenario, the operator may be subjected to external forces, such as gravitational and acceleration forces created by the orientation and movement of the stand-on track loader 382. For example, an external force 350 may cause the operator to move away from the stand-on track loader 382 in the direction of the external force 350.

As can be appreciated, in order to remain standing on the stand-on track loader 382, the operator has to provide a counter-force having a magnitude at least as great as a magnitude of the external force 350. Accordingly, the operator may apply a stabilizing force 352 in a vector passing through the input locus 322. Because the input locus 322 has a fixed position, the stabilizing force 352 results in a responsive force 354 that counteracts the external force 350. Said another way, the stabilizing force 352 results in a responsive force 354≥the external force 350. Resultantly, the operator may maintain or modify their position relative to the stand-on track loader 382, while continuing to engage the operator-engagement region of the handle (indicated by reference numerals 324 and 320, respectively, in FIGS. 8A and 8B). Further, because the control device 300 resists movement in response to forces applied in vectors passing through the input locus 322, the operator may apply the stabilizing force 352 directly to the control device 300, without generating unwanted inputs.

Figure 9B:
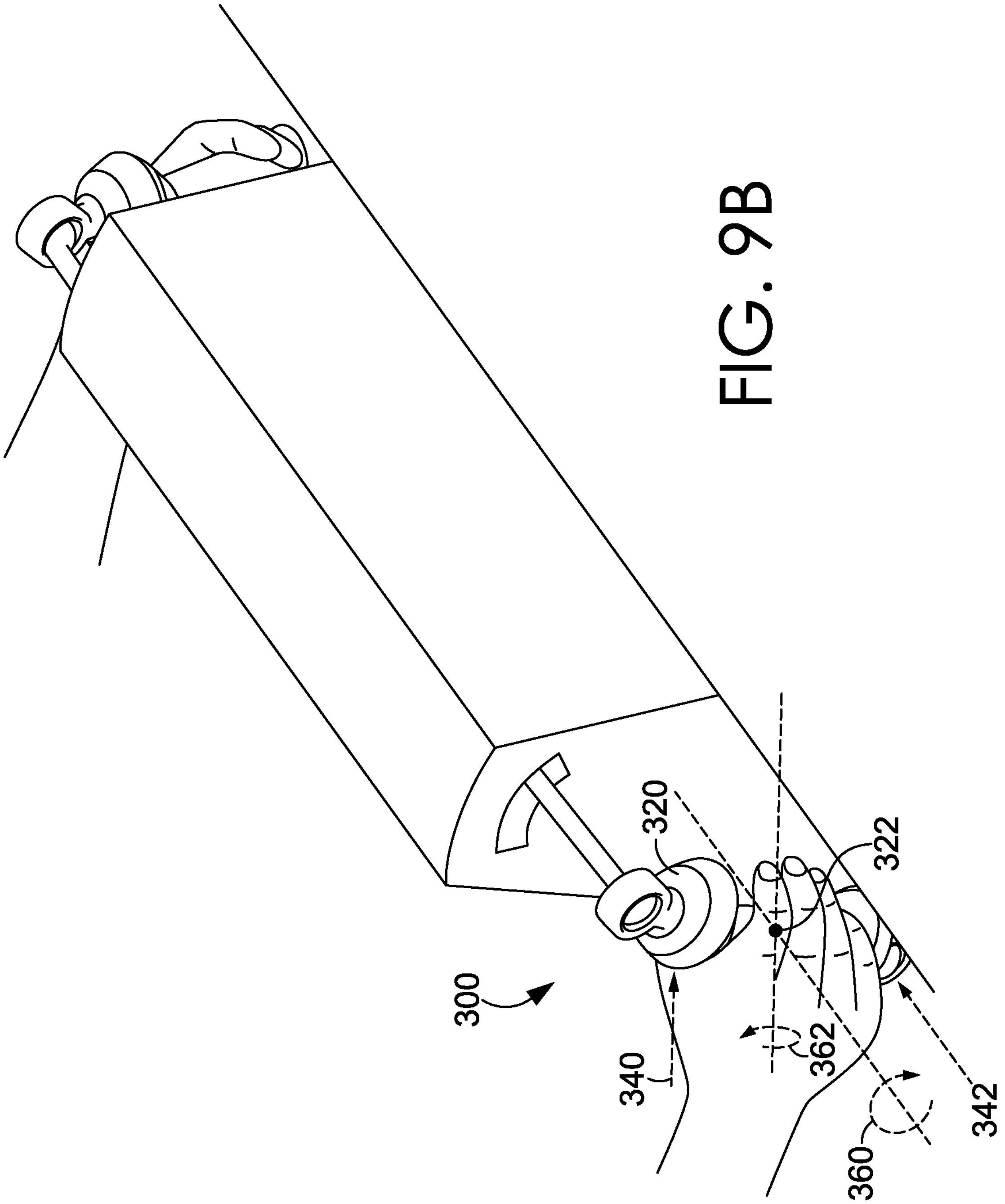
FIG. 9B depicts an enlarged, partial perspective view of the exemplary implementation shown in FIG. 9A, in accordance with aspects hereof.

FIG. 9B depicts a close-up view of the exemplary implementation 380 of FIG. 9A, having input forces applied thereto. The forces (e.g., external force 350, stabilizing force 352, and responsive force 354) depicted in FIG. 9A have been hidden for clarity in FIG. 9B. However, it should be understood that the forces depicted in FIG. 9A may be applied concurrently with the input forces depicted in FIG. 9B. A first input force 340 may be applied to the control device 300 in the operator-engagement region (indicated by reference numeral 324 in FIGS. 8A and 8B) and in a vector that is offset from the input locus 322. As a result, the input assembly (indicated by reference numeral 310 in FIGS. 8A and 8B) may rotate about the input locus 322 to generate the first rotational input 360. Additionally, a second input force 342 may be applied to the control device 300 in the operator-engagement region (indicated by reference numeral 324 in FIGS. 8A and 8B) and in a vector that is offset from the input locus 322, resulting in a second rotational input 362. It should be appreciated that the second rotational input 362 and the first rotational input 360 (along with corresponding controls) may be generated simultaneously. Further, it should be understood that the input forces 340 and 342 may be applied simultaneously with the stabilizing force 352 (as depicted in FIG. 9A). Accordingly, input forces and stabilizing forces may be applied to the control devices 300 at the same time, while only generating inputs in response to the input forces. As a result, unintended inputs may be reduced or eliminated. Resultantly, the operator may stabilize their body while simultaneously generating inputs for controlling the equipment.

Figure 10A:
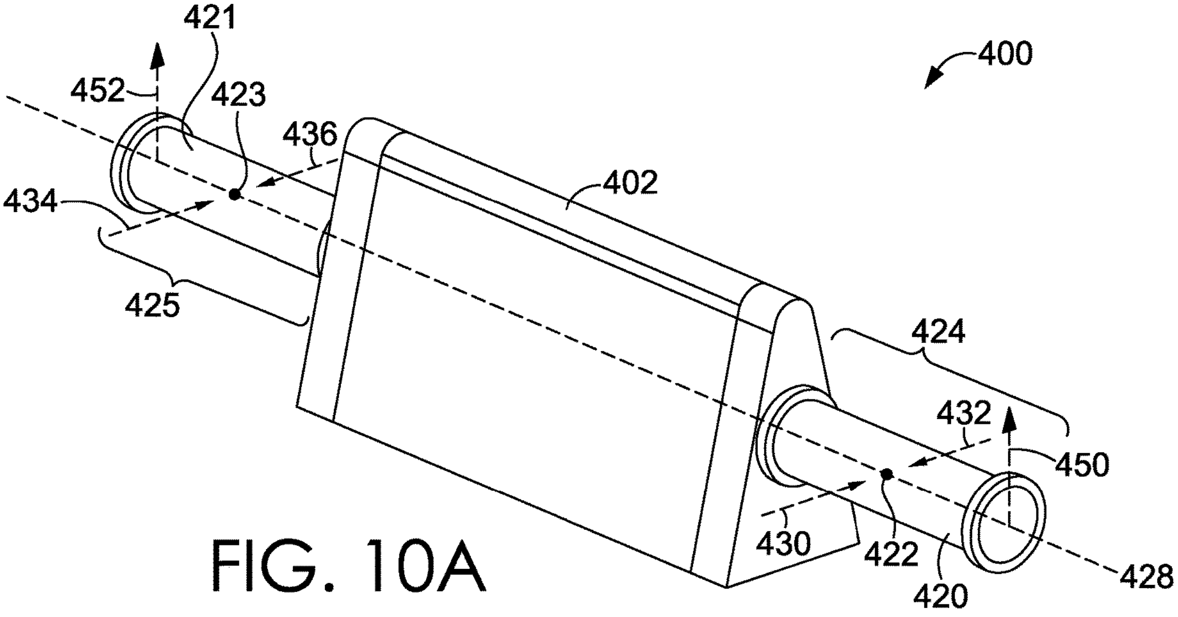
FIGS. 10A and 10B, depict perspective views of yet another exemplary embodiment of a control device, in accordance with aspects hereof.

Turning now to FIG. 10A, yet another exemplary embodiment is depicted. In this embodiment, a control device 400 may include a mount 402 and rotary handles 420 and 421, which may be rotatably coupled with the mount 402. Rotary handles 420 and 421 may be substantially similar structures, each having an operator-engagement region 424 and 425, and an input loci 422 and 423. The input loci 422 and 423 may be positioned within the rotary handles 420 proximate a center point of the operator-engagement region 424. Additionally, the input loci 422 and 423 may be positioned coaxially with one another about a rotational axis 428. The rotary handles 420 and 421 may be coupled with the mount 402 such that the rotary handles 420 and 421 resist movement in response to forces applied to the operator-engagement regions 424 and 425 in force vectors passing through the rotational axis 428. For example, exemplary applied forces 430 and 434 are applied in vectors passing through the rotational axis 428. Because the rotary handles 420 and 421 have a fixed position relative to one another and to the mount 402, the applied forces 430 and 434 are met with equal and opposite reactive forces 432 and 436. For example, reference lines 450 and 452 maintain the orientation shown in FIG. 10A when forces are applied to the operator-engagement regions 424 and 425 in vectors passing through the rotational axis 428. As a result, an operator may apply forces, such as stabilizing forces, to the control device 400 without producing an unintended input.

Figure 10B:
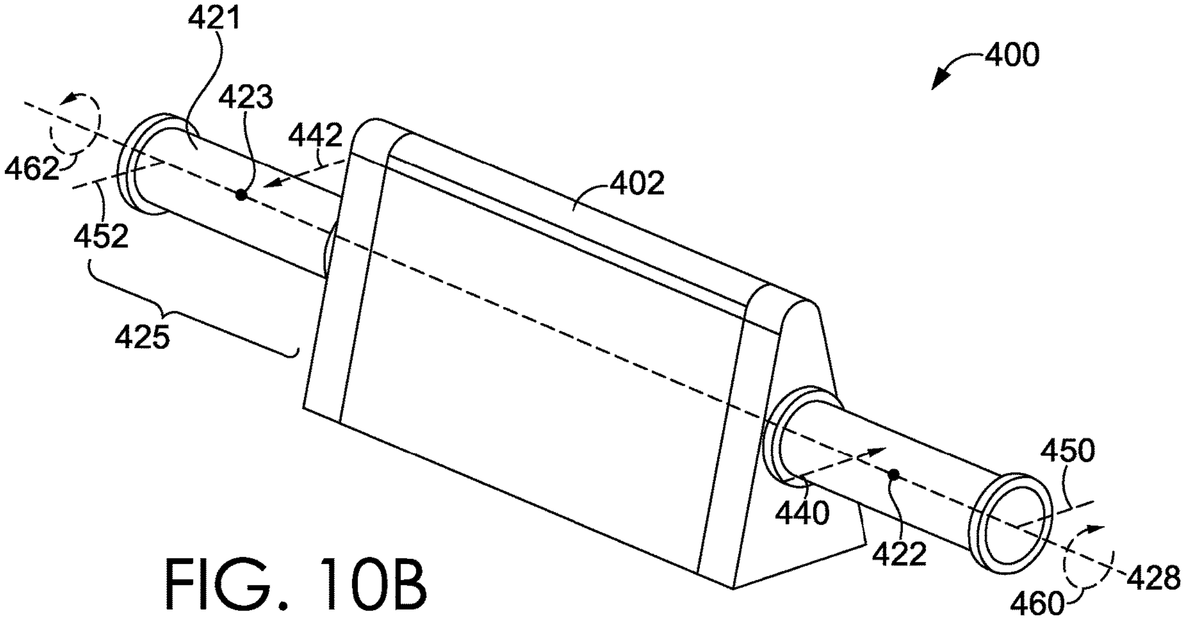

FIG. 10B depicts the control device 400 of 10A with input forces applied thereto. For example, a first input force 440 may be applied to the rotary handle 420 in a force vector that is offset from the rotational axis 428. As a result, the rotary handle 420 rotates about the rotary axis and a first rotational input 460 is generated. For example, reference line 450 has rotated approximately 90° from the initial position shown in FIG. 10A. As can be appreciated, the rotary handles 420 and 421 may be rotated in opposite directions, for example, to cause a controlled-apparatus to make a tight turn. Accordingly, a second input force 442 may be applied to the opposite rotary handle 421 in a force vector that is offset from the rotational axis 428. As indicated by reference line 452, the rotary handle 420 is rotated in response to the second input force 442 and a second rotational input 462 is produced.

Figure 11A:
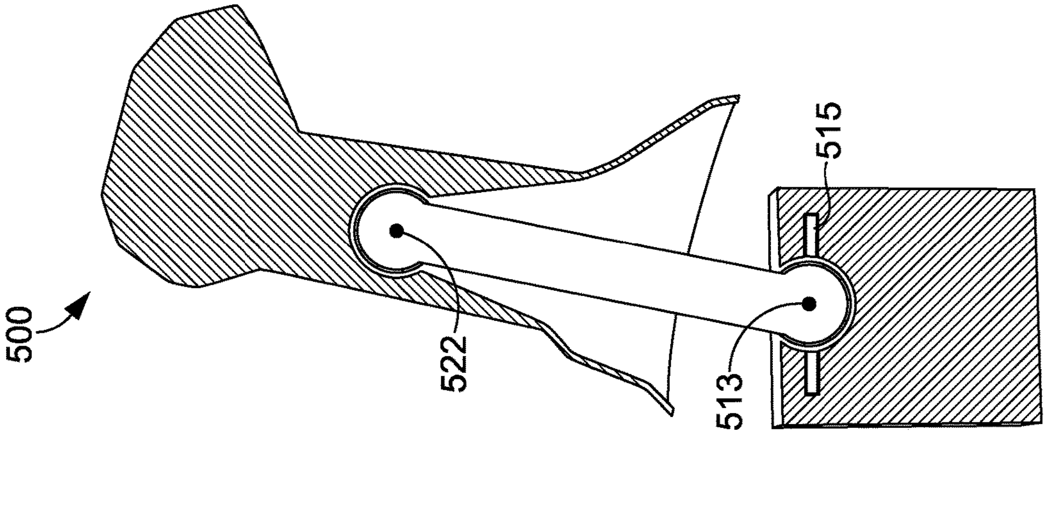
FIGS. 11A, 11B, and 11C, depict perspective views of yet another exemplary embodiment of a joystick-type control device, in accordance with aspects hereof.
Figure 11B:
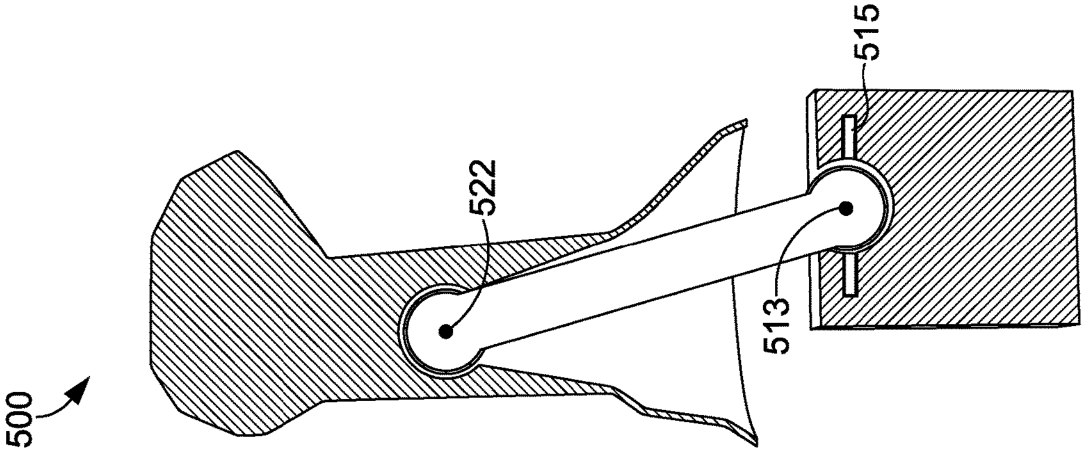
Figure 11C:
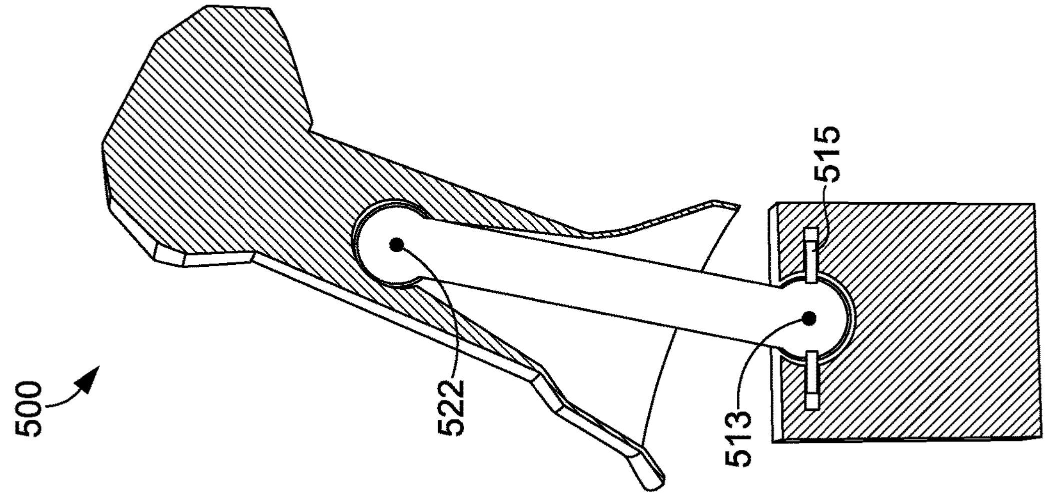

In another aspect shown in FIGS. 11A, 11B, and 11C, a joystick-type control device 500 may be provided with an input locus 522 and a pivot locus 513 positioned within a base that is selectively fixed at a desired position. The joystick-type control device 500 is similar to the joystick described in more detail with reference to FIGS. 6A-7B. Accordingly, the parts described with reference to the joystick-type control device 500 may be identified according to the reference numerals in FIGS. 6A-7B, unless otherwise indicated.

The control device 500 is depicted in FIG. 11A with a locking mechanism 515 in an unlocked position. When in the unlocked position, the control device 500 may pivot about each of the pivot locus 513 and the input locus 522 simultaneously. Accordingly, inputs may be generated as a result of movement about both the pivot locus 513 and the input locus 522, for example, as shown in FIG. 11B. Additionally, the control device 500 may include a selectable element (now shown here), such as a trigger or a button, that when selected causes the rod to lock in place relative to the base via the locking mechanism 515.

Figure 12B:
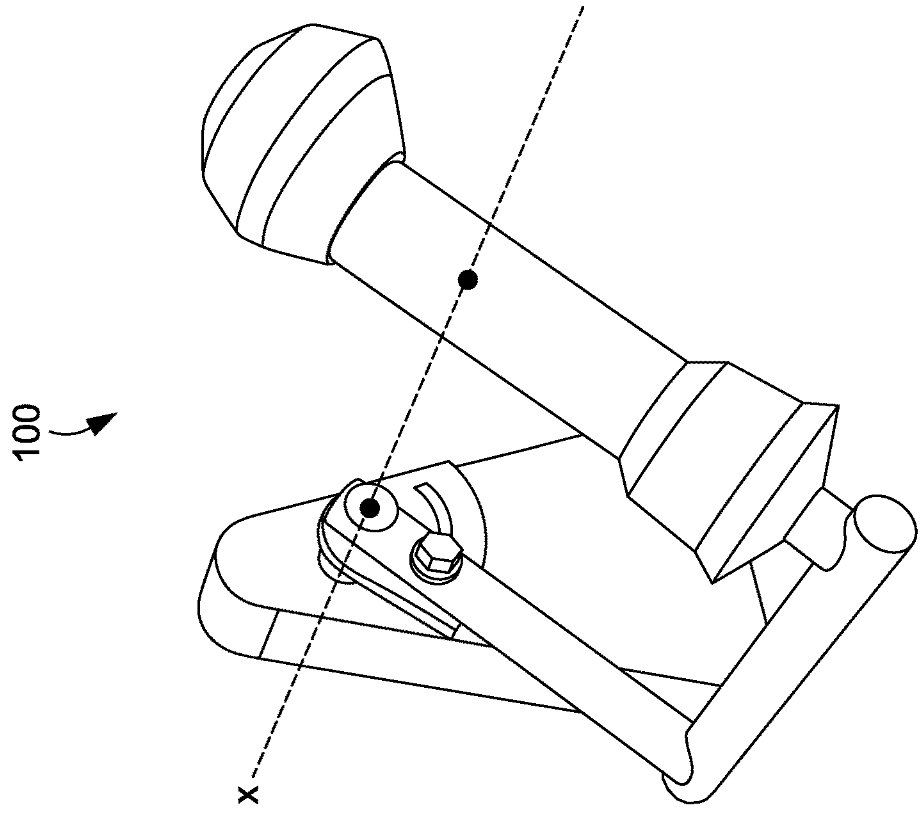
FIGS. 12A and 12B, depict perspective views of an exemplary embodiment of an adjustable control device, in accordance with aspects hereof.
Figure 12A:
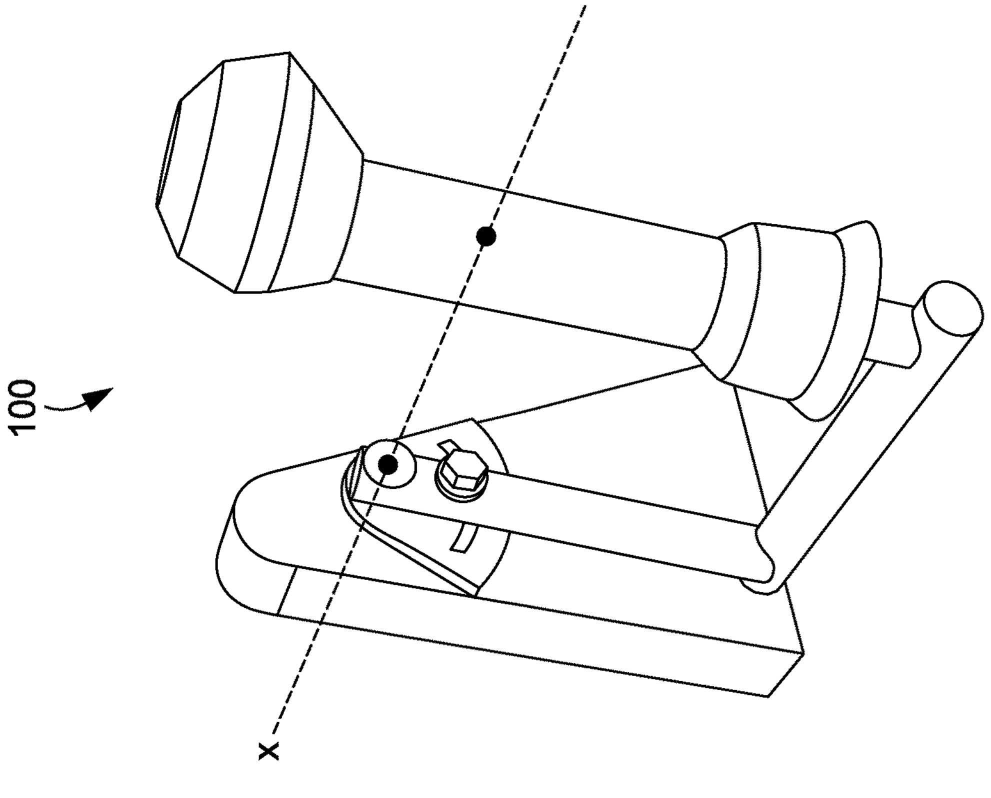

As a result, movement about the pivot locus 513 may be selectively prevented or allowed. Accordingly, the input locus 522 may be dynamically (i.e., on-demand) locked in a fixed position, as shown in FIG. 11C. Accordingly, in the locked position, the control device 500 can provide an input locus 522 at a fixed position, as described hereinabove. In another aspect, the pivot locus 513 may be automatically locked in place when certain conditions are detected. For example, the control device 500 (or a controlled-apparatus) may include a tilt sensor that, when a threshold degree of tilt or pitch is detected, causes the pivot locus 513 to lock in place. It should be understood that the locking mechanism 515 depicted in the figures is exemplary only, and should not be construed as limiting in any sense. To the contrary, it is contemplated that any suitable locking or securing mechanism may be used to secure the rod relative to the base. FIGS. 12A and 12B depict one example of a control device that is adjustable through a range of positions. For example, the orientation of the control device may be adjusted to a desired angle, depending on the implementation of the control device or preferences of an operator. As shown in FIG. 12A, the exemplary control device 100 (also shown in FIGS. 4A-5B) can be fixed relative to the mount in a first position at a first angle. The position depicted in FIG. 12A represents a rest or neutral position of the control device 100. If desirable, the neutral position of the control device may be modified to another position or angle, for example, as shown in FIG. 12B (the range of positions shown here is not intended to be limiting). It should be appreciated that FIGS. 12A and 12B are exemplary only, and that any suitable mechanism for adjusting a neutral position or orientation of the various embodiments herein are within the scope of this disclosure.

In some aspects, it is advantageous to provide damping to the control system and/or components coupled thereto. Damping may provide intended and controlled resistance to rotation of the control device, which may be desirable to help prevent unintended rotation of the control device. For example, a device controlled with a control device such as those described herein may suffer from lurching. That is, the device, machine or component controlled may make an abrupt movement when the control device is rotated too quickly. For example, a stand-on mower may lurch when an acceleration is produced too quickly, which may occur upon the onset of movement or during a sudden change in acceleration. Providing a damping resistance can assist an operator by providing feedback and limiting the speed at which a change in acceleration (or other response) may occur. In addition, a damping resistance may also be used to help maintain the control device in a rotated position. The damping may bias the control device to remain in the rotated position. For example, the damping resistance may be sufficient enough to hold the control device in the rotated position. In some aspects, the control device may be biased (e.g., by a spring, by gravity, etc.) to return to the neutral position and the damping resistance may urge a slower return to the neutral position than the bias alone would impart.

Figure 13:
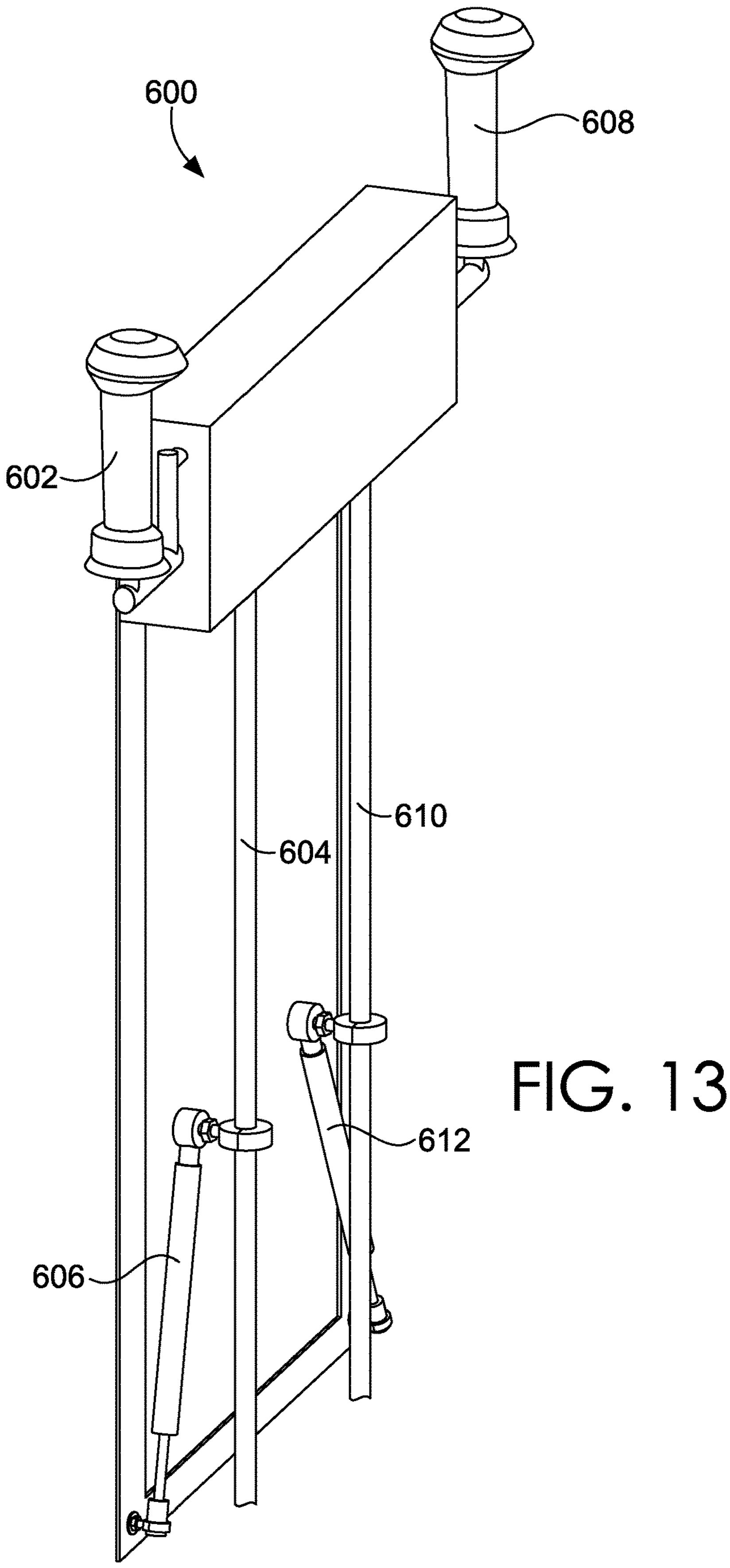
FIG. 13 depicts a perspective view of an exemplary implementation of a control device having a damping system, in accordance with aspects hereof.

In an aspect illustrated in FIG. 13, an exemplary system 600 is provided with damping. The exemplary system 600 includes a control device 602 that is mechanically coupled (not shown) to a drive unit (not shown) via one or more links of a linkage 604 and a damper 606 is coupled to one of the links of the linkage 604. As discussed herein, the control device 602 can be configured to rotate and actuate the one or more links of the linkage 604. In turn, movement of the one or more links of the linkage 604 may actuate the drive unit and produce a response corresponding to the rotation of the control device 602. The damper 606 may be coupled to the control device 602, one or more of the links forming the linkage 604, and/or the drive unit. In some aspects, multiple dampers may be attached to one or more of said components of the exemplary system 600. The illustrated damper 606 is a hydraulic damper. However, other types of dampers (e.g., spring, torsion, friction, etc.) are contemplated for providing damping to the exemplary system 600.

The illustrated aspect shown in FIG. 13 of the exemplary system 600 also includes a second control device 608 that is mechanically coupled (not shown) to a second drive unit (not shown) via one or more links of a second linkage 610 and a second damper 612 is coupled to one of the links of the second linkage 610. The second control device 608, the second linkage 610, and the second damper may operate much the same way as the control device 602, the linkage 604 and the damper 606, but may operate independently to control the second drive unit, in accordance with some aspects.

Turning now to FIGS. 14A-14E, alternative aspects of a handle 700 are shown. The handle 700 may comprise a sleeve that is fitted over a rod of a control device. The handle 700 may also comprise a plurality of pieces that are secured together around the rod of the control device. In other aspects, the handle 700 may be formed as a unitary object having the shape illustrated. The handle 700 may be formed through a molding process, 3-D printing process or other suitable process.

The illustrated aspect of the handle 700 includes a tubular body 702 having an operator engagement region 704. The handle 700 generally includes a front side 706, a rear side 708 opposite the front side 706, a right side 710, and a left side 712 opposite the right side 710. Proximate the operator engagement region 704 is a thumb flange 714 extending radially outward from the tubular body 702. In the illustrated aspect, the thumb flange 714 extends from the right side 710. In other aspects, the thumb flange 714 may extend from the left side 712 (e.g., a right-hand operated handle). The thumb flange 714 may also extend in part from the front side 706 and/or the rear side 708. On a distal end 716 of the tubular body 702 is a forefinger notch 718 is formed. The illustrated forefinger notch 718 includes a first portion of the tubular body 702 extending farther at the distal end 716 than a second portion of the tubular body 702. The rear side 708 may include one or more channels 720 for receiving an operator's fingers when the handle 700 is grasped. The one or more channels 720 extend from the right side 710, across the rear side 708 to the left side 712, in some aspects.

Figure 14B:
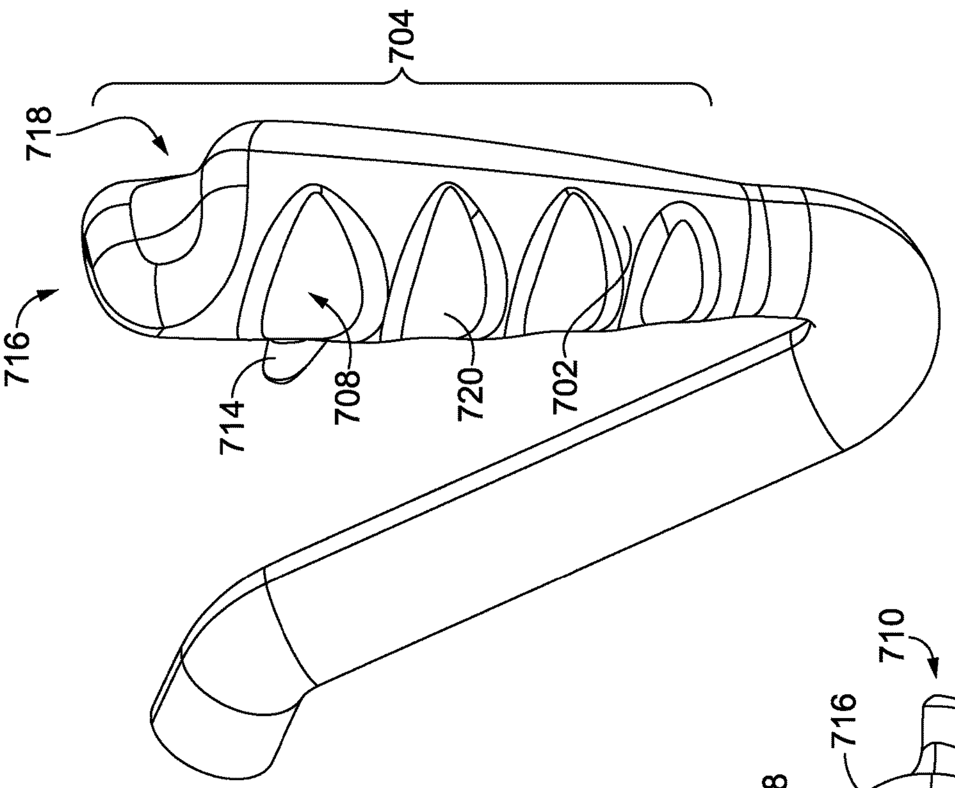
FIGS. 14A and 14B depict perspective views of an exemplary handle of a control device, in accordance with aspects hereof.
Figure 14C:
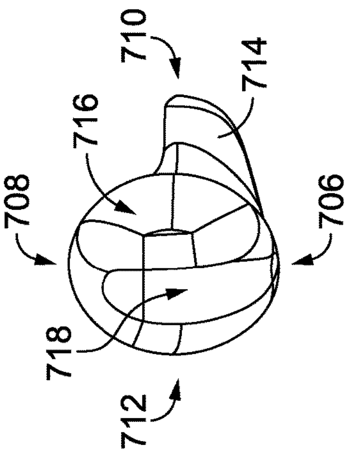
FIG. 14C depicts a top view of a portion of the exemplary handle shown in FIGS. 14A and 14B, in accordance with aspects hereof.
Figure 14A:
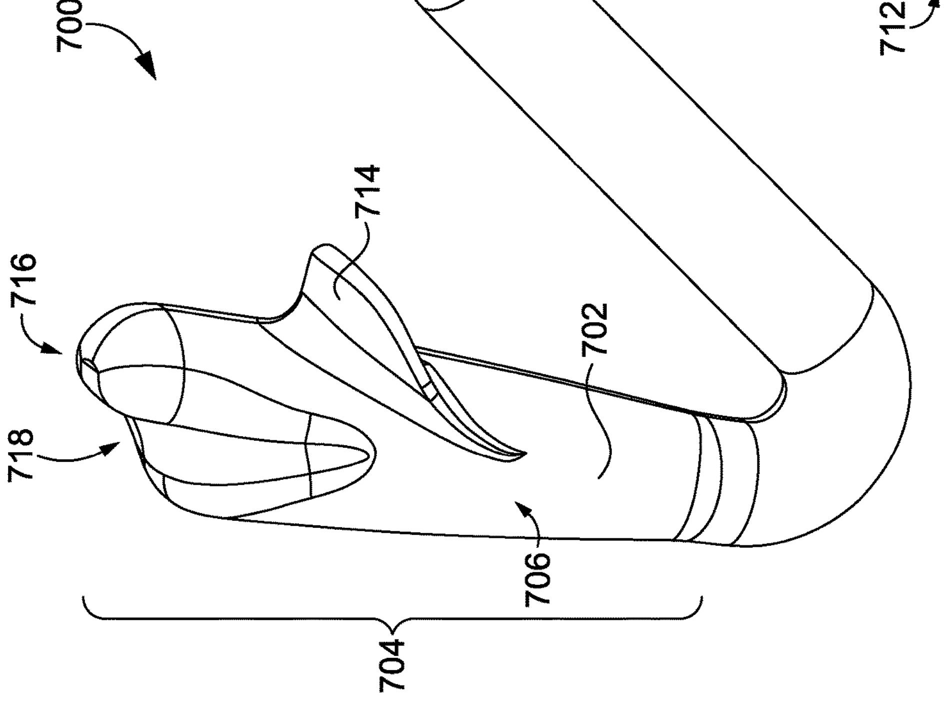
Figure 14D:
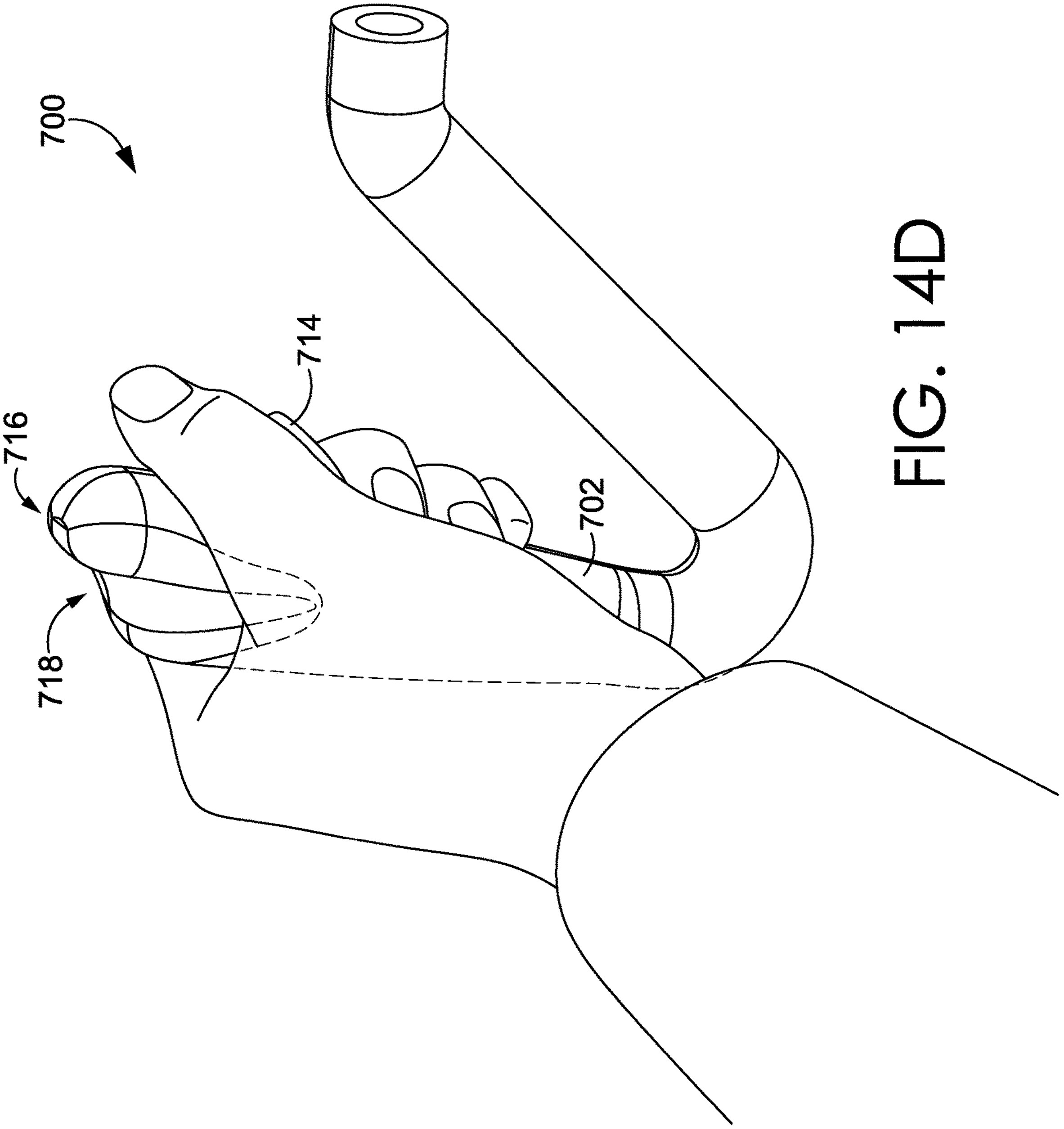
FIG. 14D depicts a perspective view of the exemplary handle shown in FIGS. 14A, 14B and 14C in a first gripped position, in accordance with aspects hereof.
Figure 14E:
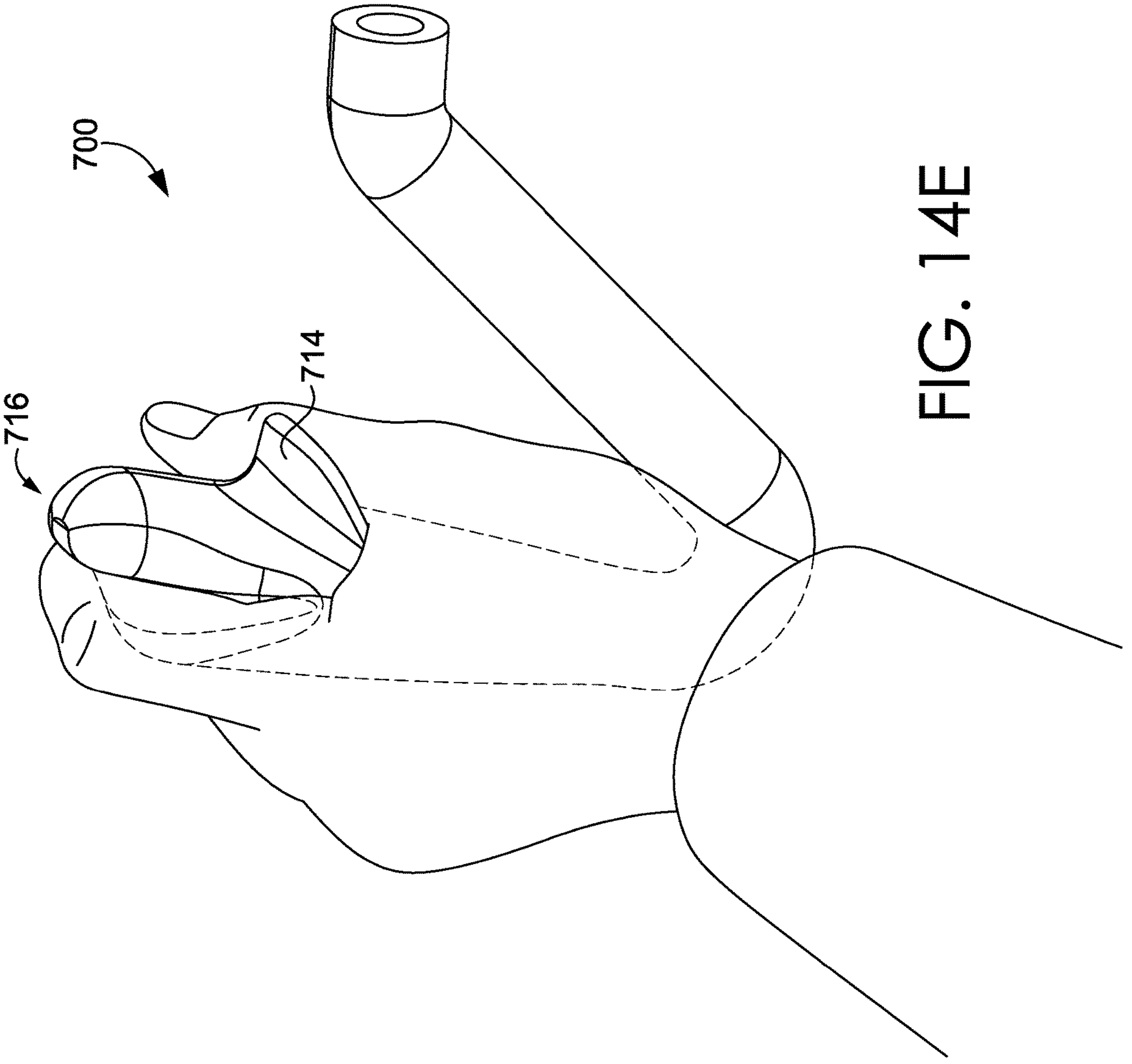
FIG. 14E depicts a perspective view of the exemplary handle shown in FIGS. 14A, 14B and 14C in a second gripped position, in accordance with aspects hereof.

An operator may grip the handle 700 in the operator engagement region 704 and rotate the control device in a plurality of ways. For example, in FIG. 14D the operator has grasped the handle 700 such that the palmar region of the operator's hand is proximate the left side 712 while the operator's fingers wrap around the handle 700 from the left side 712, across the rear side 708 and towards the right side 710. The operator's thumb rests on the distal end 716 side of the thumb flange 714. The operator may rotate the handle 700 by an ulnar or radial deviation movement of their wrist. Turning to FIG. 14E, the operator has grasped the handle 700 such that the palmar region of the operator's hand is proximate the front side 706 while the operator's forefinger extends up the front side 706 to the forefinger notch 718. The operator's thumb rests below the thumb flange 714 relative to the distal end 716. The operator may rotate the handle 700 by a flexion or extension movement of their wrist.

Figure 15B:
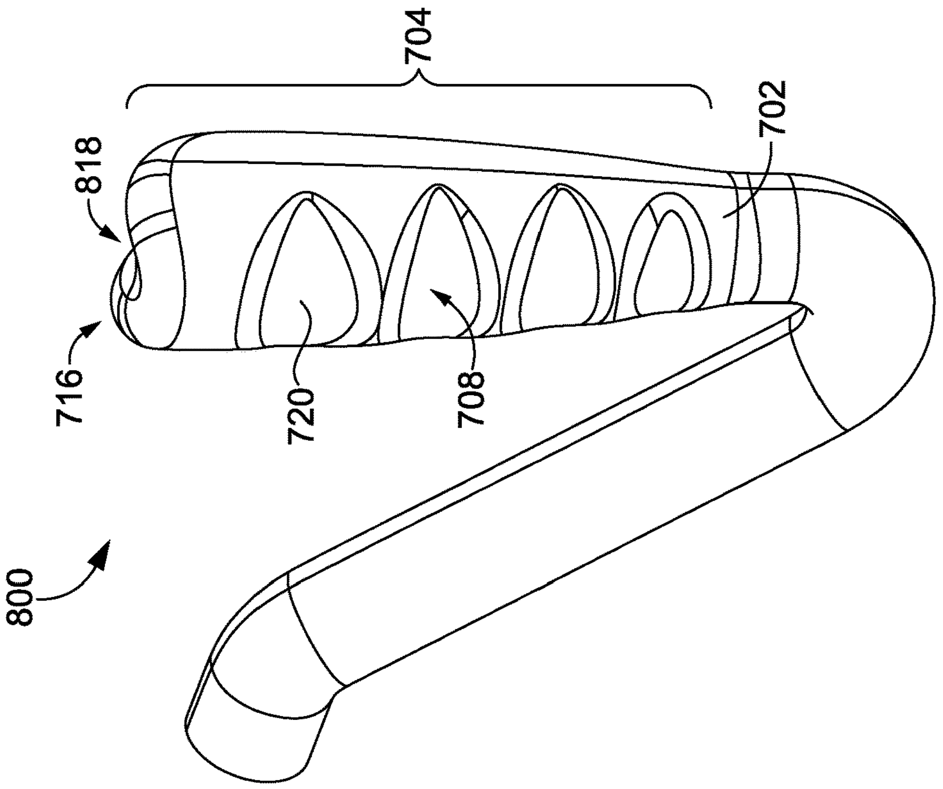
FIGS. 15A and 15B depict perspective views of another exemplary handle of a control device, in accordance with aspects hereof.
Figure 15A:
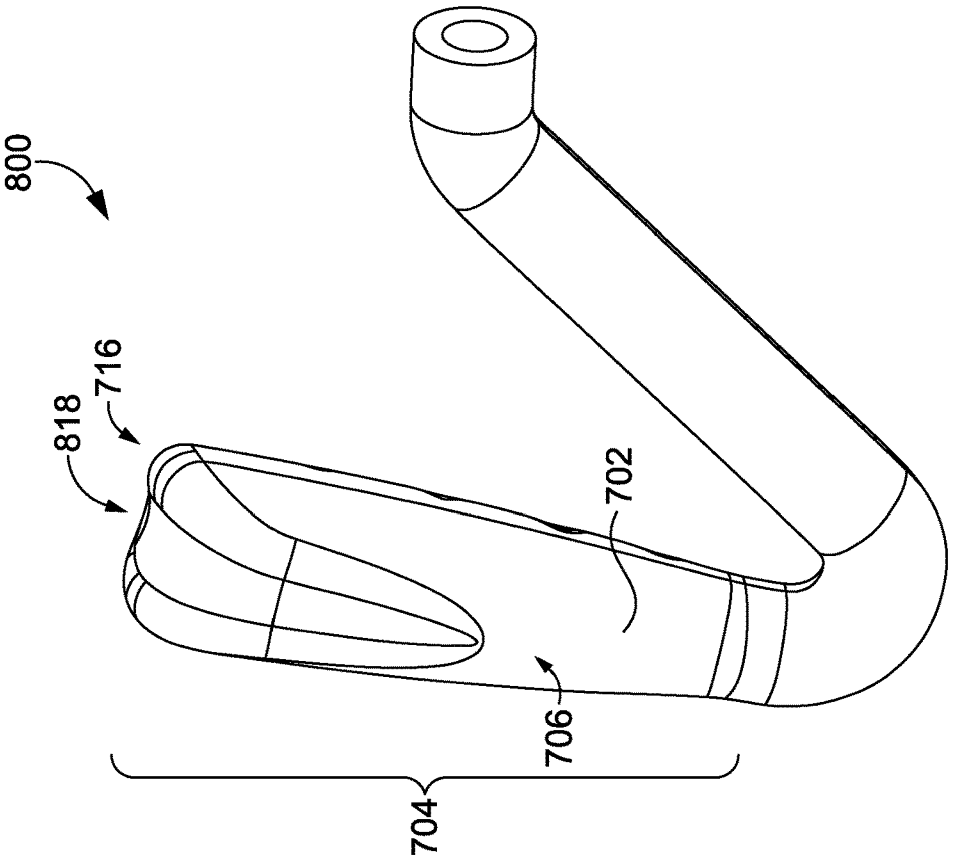

Another alternative handle 800 is illustrated in FIGS. 15A-15B. In the illustrated aspect, the handle 800 includes much of the same structure as the handle 700, and such corresponding elements are labeled with the same reference numbers. The thumb flange has been removed, however, in this aspect. Also, a forefinger notch 818 having a different structure and position is formed. The forefinger notch 818 comprises a channel that extends up the front side 706 from the operator engagement region 704 to the distal end 716, such that when the handle 800 is gripped for a flexion or extension wrist movement (e.g., similar to grip shown in FIG. 14E) the operator's forefinger is cradled in the forefinger notch 818.

Figure 16A:
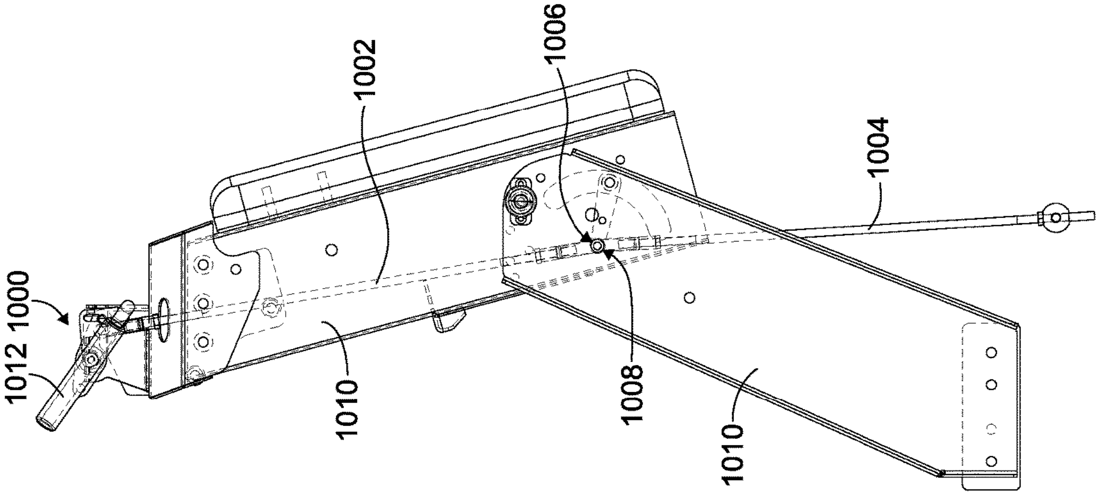
FIG. 16A depicts a side view of a first embodiment of a convertible mower in a stand-on configuration, in accordance with aspects hereof.
Figure 16B:
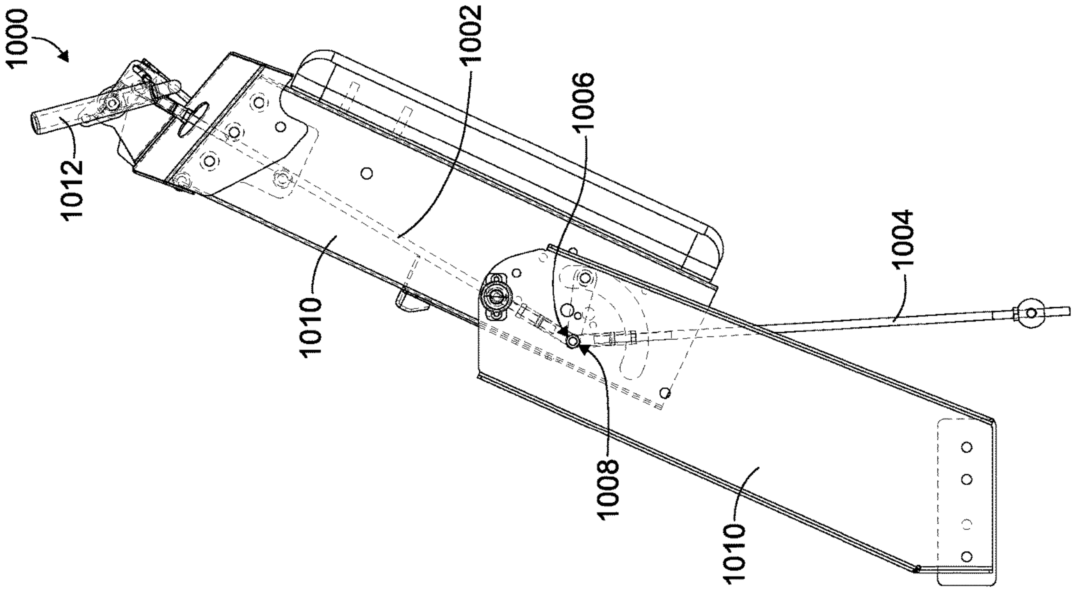
FIG. 16B depicts a side view of the first embodiment of the convertible mower shown in FIG. 16A in a walk-behind configuration, in accordance with aspects hereof.

As described herein, a control device 1000 may be used on a stand-on mower in accordance with some aspects. As illustrated in FIGS. 16A and 16B, some stand-on mowers may be convertible into walk-behind mowers by pivoting a tower 1010 rearwardly relative to the mower. For example, FIG. 16A shows a first embodiment of a convertible mower in a stand-on configuration and FIG. 16B shows the first embodiment of the convertible mower in a walk-behind configuration. Such convertible mowers often include a control device 1000 pivotally coupled to a first link 1002, the first link 1002 in turn coupled to a second link 1004 at a linkage pivot point 1006, and the second link 1004 coupled to a drive unit (not shown). The control device 1000 is also coupled with the tower 1010. In the first embodiment a tower pivot point 1008 and the linkage pivot point 1006 were aligned and coaxial such that the first link 1002 and the tower 1010 folded from the same axis. Folding from the same axis, however, would result in the control device 1000, and more particularly a handle 1012 of the control device 1000, rotating to an uncomfortable angle in one of the stand-on configuration or the walk-behind configuration.

Figure 17B:
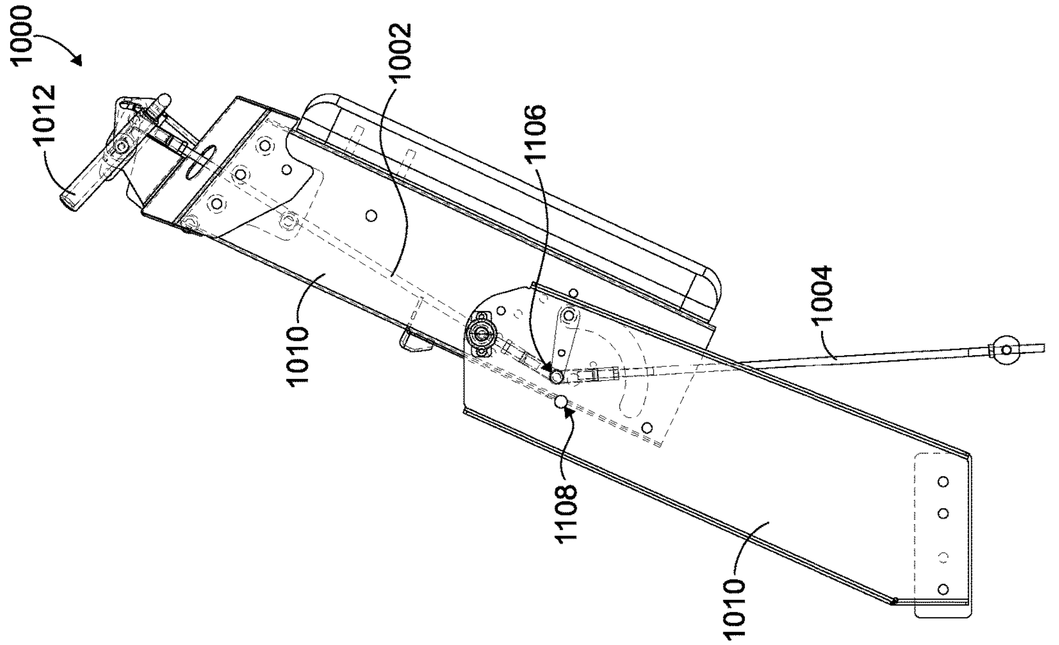
FIG. 17B depicts a side view of the second embodiment of the convertible mower shown in FIG. 17A in a walk-behind configuration, in accordance with aspects hereof.
Figure 17A:
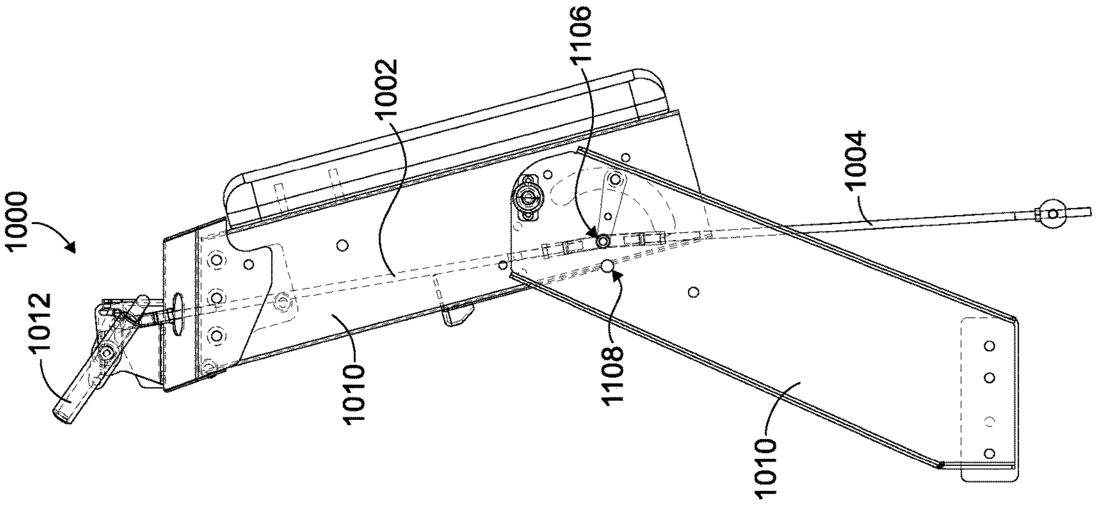
FIG. 17A depicts a side view of a second embodiment of a convertible mower in a stand-on configuration, in accordance with aspects hereof.

In order to maintain a comfortable angle in both of the stand-on configuration and the walk-behind configuration, a tower pivot point 1108 and a linkage pivot point 1106 may be offset from one another, as shown in a second embodiment of a convertible motor illustrated in FIGS. 17A and 17B. Like reference numbers from FIGS. 16A and 16B are used on corresponding features in FIGS. 17A and 17B. FIG. 17A illustrates a stand-on configuration and FIG. 17B illustrates a walk-behind configuration. As shown in FIGS. 17A and 17B, the exemplary convertible mower maintains the same relative position of the control device 1000 and the handle 1012 in both configurations. The offset between the tower pivot point 1108 and the linkage pivot point 1106 results in a four-bar linkage where the relative position of the control device 1000 and the handle 1012 is maintained relative to an operator. In the illustrated aspect shown in FIGS. 17A and 17B, the tower pivot point 1108 is moved forward from the linkage pivot point 1106. However, in other aspects the linkage pivot point 1106 could be moved away from the tower pivot point 1108. In still other aspects, both the tower pivot point 1108 and the linkage pivot point 1106 could be moved, relative to their position in the first embodiment (shown in FIGS. 16A and 16B), to locations offset from one another.

In some aspects, it may be beneficial for a convertible mower to provide a deep clearance behind a deck of the convertible mower when in the walk-behind configuration. For example, a larger clearance behind the deck may allow an operator more room to maneuver their body while grasping a control device, which may provide a more comfortable and functional use of the convertible mower. In other aspects, it may be necessary to provide a large clearance behind the deck to satisfy safety or other regulations. Providing a deep or large clearance behind the deck when the convertible mower is in the walk-behind configuration may require the tower to pivot farther back. Controlling a drive unit in mechanical implementations (e.g., where the control device is coupled to a linkage that is in turn coupled to the drive unit) may become less efficient the farther back the tower is pivoted. For example, the range of vertical movement of the linkage that can be produced by the control device may be too small to fully actuate the drive unit.

Figure 18A:
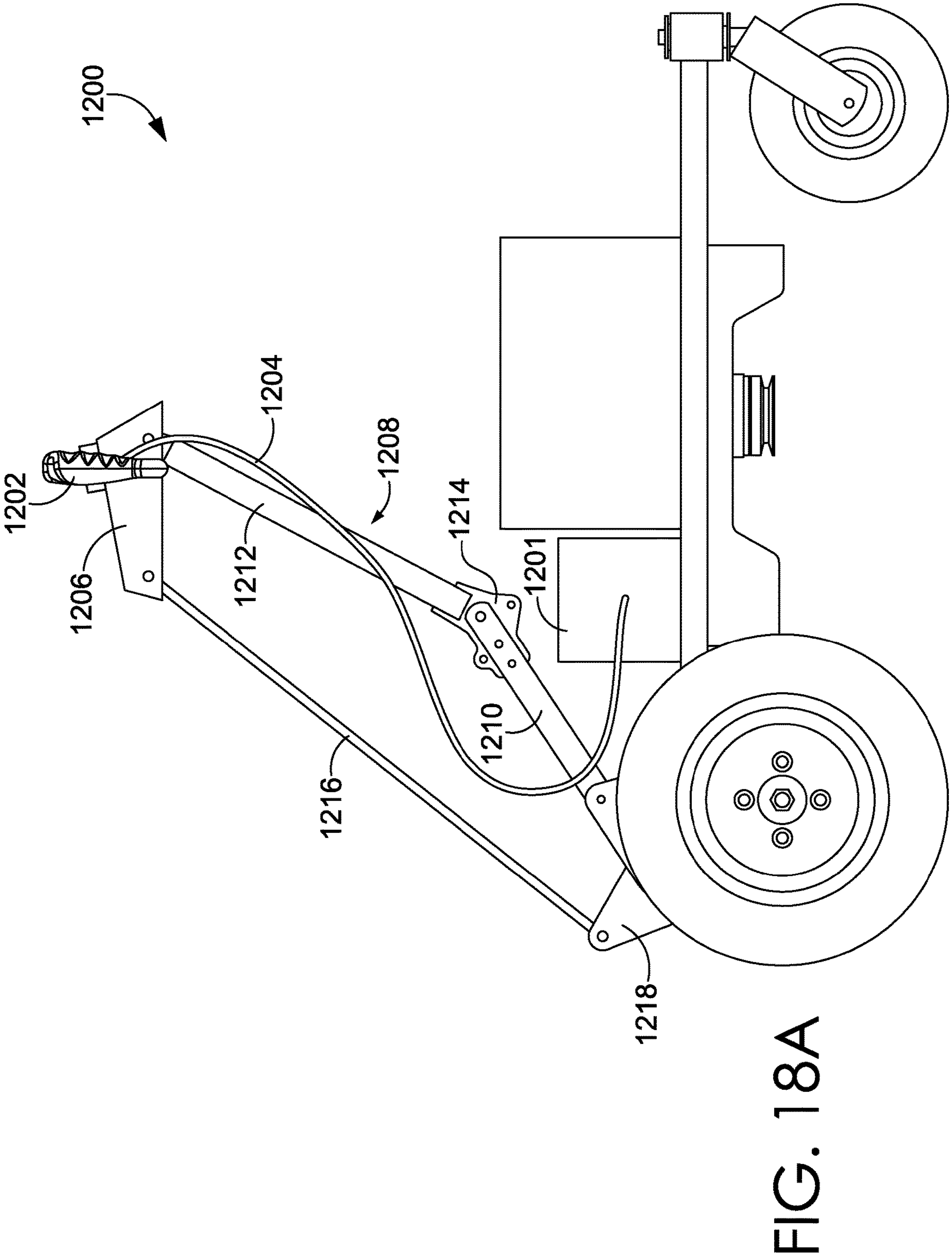
FIG. 18A depicts a side view of a third embodiment of a convertible mower in a stand-on configuration, in accordance with aspects hereof.
Figure 18B:
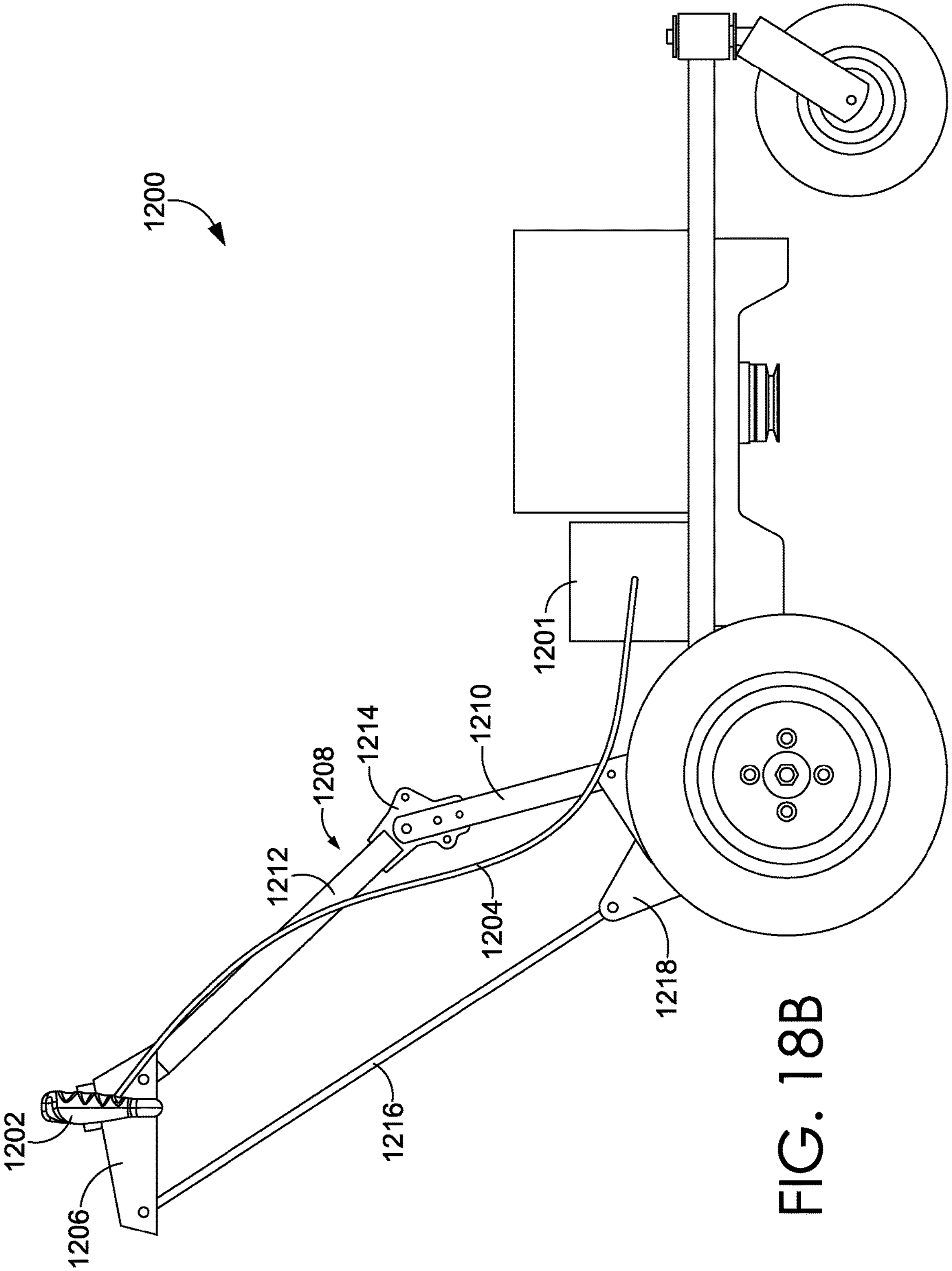
FIG. 18B depicts a side view of the third embodiment of the convertible mower shown in FIG. 18B in a walk-behind configuration, in accordance with aspects hereof.

Referring now to FIGS. 18A and 18B, a third embodiment of a convertible mower 1200 may utilize a cable system 1204 to actuate a drive unit 1201 (e.g., a hydrostatic drive). The cable system 1204 can replace the linkage of other implementations (e.g., the first link 1002 and the second link 1004 of the first and second embodiments shown in FIGS. 16A-17B). The cable system 1204 may be coupled on a first end to the drive unit 1201 and coupled on a second end to a control device 1202. The cable system 1204 may comprise a push-pull cable that moves farther in or out of a cable conduit in response to rotation of the control device 1202. The cable conduit includes a third end proximate the first end of the cable and further includes a fourth end proximate the second end of the cable. The third end may be coupled proximate the drive unit 1201 (e.g., to a linkage or to the mower frame proximate the drive unit) or the third end may be coupled directly to the drive unit 1201. Similarly, the fourth end may be coupled proximate the control device 1202. For example, the forth end may comprise a threaded port that may releasably fastened to a mounting plate 1206 positioned at the distal end of a tower 1208. The control device 1202 may be fixedly mounted to the mounting plate 1206.

Thus, the drive unit may be actuated by rotation of the control device 1202 via the cable system 1204. For example, as the control device 1202 rotates, the cable system 1204 causes the push-pull cable to move towards the drive unit 1201 (or away from the drive unit depending on the direction of rotation of the control device 1202). The coupling between the cable system 1204 and the drive unit 1201 may be configured such that the movement of the push-pull cable towards or away from the drive unit 1201 produces a response from the drive unit (e.g., an increase or decrease in acceleration in the forward or backward direction). Using the cable system 1204 as the connection between the control device 1202 and the drive unit 1201, however, removes one or two of the bars from the four-bar linkage discussed above with reference to FIGS. 17A and 17B. In order to prevent the control device 1202 from rotating relative to the ground as the tower 1208 moves from the stand-on configuration to the walk-behind configuration, a different four-bar linkage may be provided.

Maintaining the relative orientation of the control device 1202 to the ground as the tower 1208 moves from the stand-on configuration to the walk-behind configuration may be accomplished as shown in the third embodiment illustrated in FIGS. 18A and 18B. The tower 1208 of the third embodiment includes a lower portion 1210 pivotally coupled to an upper portion 1212 at a knee 1214. Further, the mounting plate 1206 is pivotally coupled with the upper portion 1210 of the tower 1208. In addition, the mounting plate 1206 is also pivotally coupled with at least one additional link. For example, the at least one additional link may comprise a third link 1216 pivotally coupled to the mounting plate 1206 and extending proximally towards the convertible mower 1200. In some aspects, the third link 1216 is pivotally coupled with the convertible mower 1200 frame. In the illustrated aspect, the third link 1210 is pivotally coupled to a flange 1218 attached to the lower portion 1210 of the tower 1208. In other aspects, the third link 1216 may be pivotally coupled with a fourth link (not shown). It is contemplated that the fourth link may be pivotally coupled anywhere below the knee 1214 of the tower 1208. As a result, the relative orientation of the mounting plate 1206, and thus the control device 1202, to the ground is maintained as the tower 1208 moves from the stand-on configuration to the walk-behind configuration.

Additionally, although some exemplary implementations of the embodiments described herein are shown in the accompanying figures, these implementations are not intended to be limiting. Rather, it should be understood that the various embodiments and aspects described herein may be used to control any apparatus, machine, or device. For example, the control devices described herein may be used to control computing devices, watercraft, aircraft, manufacturing machinery, and any number of other suitable devices, machines, or apparatuses.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A control device comprising:

a mount;

a first handle rotatably coupled with the mount, the first handle having an operator-engagement region with a portion to engage an operator's palm; and a first input locus about which the first handle rotates on a rotational axis extending perpendicular to the portion of the first handle, the first input locus positioned within the operator-engagement region, wherein rotation of the handle about the first input locus provides a first input;

the first handle coupled with the mount to prevent movement in response to a first force in a first force vector extending through the first input locus and to rotate in response to a second force in a second force vector offset from the first input locus;

a second handle rotatably coupled with the mount, the second handle having an operator-engagement region with a portion to engage an operator's palm;

a second input locus about which the second handle rotates on a rotational axis extending perpendicular to the portion of the second handle, the second input locus positioned within the operator-engagement region, wherein rotation of the handle about the second input locus provides a second input, the second handle coupled with the mount to prevent movement in response to a third force in a third force vector extending through the second input locus and to rotate in response to a fourth force in a fourth force vector offset from the second input locus, the control device comprising a first adjustment mechanism with a first arcuate slot to adjust a first neutral rotational position of the first handle at the first input locus and a second adjustment mechanism with a second arcuate slot to adjust a second neutral rotational position of the second handle at the second input locus.

2. The control device of claim 1, wherein the first and second input loci are external to the mount.

3. The control device of claim 1, wherein the first and second loci are positioned proximate a center point of the operator-engagement region.

4. The control device of claim 1, wherein the first handle is rotatably coupled with the mount at the rotational axis passing through the first input locus.

5. The control device of claim 4, wherein the first handle is rotatable relative to the mount about the axis of rotation.

6. The control device of claim 1, wherein the first handle prevents movement in a second axis and a third axis, each passing through the first input locus.

7. The control device of claim 1, wherein the first handle includes a non-vertical neutral position in a plane transverse to the rotational axis.

8. The control device of claim 1, wherein the first input locus has a fixed position relative to the vehicle in a lateral axis, a longitudinal axis, and a vertical axis.

9. A control device comprising:

a mount assembly affixed to a vehicle;

a first handle rotatably coupled with the mount assembly, the first handle having an operator-engagement region; and a first input locus about which the first handle rotates, the first input locus positioned within the operator-engagement region and having a fixed position relative to the vehicle in a lateral axis, a longitudinal axis, and a vertical axis, wherein rotation of the handle about the first input locus in the lateral axis provides a first input, wherein the first input controls rotation of a first wheel or first track of a vehicle, the first handle coupled with the mount assembly to prevent movement with respect to the mount and the vehicle in response to a first stabilizing force in a first vector extending through the first input locus and to rotate in response to a second force in a second vector offset from the first input locus; and a second handle rotatably coupled with the mount assembly, the first handle having a second operator-engagement region; and a second input locus about which the second handle rotates, the second input locus positioned within the second operator-engagement region and having a fixed position relative to the vehicle in a lateral axis, a longitudinal axis, and a vertical axis, wherein rotation of the handle about the second input locus in the lateral axis provides a second input, wherein the second input controls rotation of a second wheel or track of the vehicle, the second handle coupled with the mount assembly to prevent movement with respect to the mount and the vehicle in response to a third stabilizing force in a third vector extending through the second input locus and to rotate in response to a fourth force in a fourth vector offset from the second input locus.

10. The control device of claim 9, wherein the first input locus is positioned proximate a center point of the operator-engagement region and is positioned external to the mount assembly.

11. The control device of claim 9 further comprising, an adjustment mechanism to adjust a neutral rotational position of the first handle at the first input locus.

12. A control device comprising:

a mount;

a first handle rotatably coupled with the mount, the first handle having a first tubular body;

a first input locus about which the first handle rotates, the first input locus positioned within the first tubular body, wherein rotation of the first handle about the first input on a first axis of rotation locus provides a first input, the first axis of rotation being perpendicular to the first tubular body; and wherein the first handle is coupled with the mount to resist movement in response to a first force in a first force vector extending through the first input locus and to rotate in response to a second force in a second force vector offset from the first input locus;

a second handle rotatably coupled with the mount, the second handle having a second tubular body; and a second input locus about which the second handle rotates, the second input locus positioned within the second tubular body, wherein rotation of the second handle about the second input locus on a second axis of rotation perpendicular to the second tubular body provides a second input; and wherein the second handle is coupled with the mount to resist movement in response to a third force in a third force vector extending through the second input locus and to rotate in response to a fourth force in a fourth force vector offset from the second input locus, wherein the first input controls rotation of a first wheel or first track of a vehicle and wherein the second input controls rotation of a second wheel or track of the vehicle.

13. The control device of claim 12, wherein the first axis of rotation and the second axis of rotation are parallel.

14. The control device of claim 12, wherein the first axis of rotation and the second axis of rotation are coaxial.

15. The control device of claim 12, wherein a rotation of the first wheel or track is faster than a rotation of the second wheel or track when a degree of rotation of the first handle is larger than a degree of rotation of the second handle.

* * * * *